(12) United States Patent
Toyama

(10) Patent No.: US 9,378,166 B2
(45) Date of Patent: Jun. 28, 2016

(54) SLAVE DEVICE, MASTER DEVICE, COMMUNICATION SYSTEM, AND COMMUNICATION METHOD

(71) Applicant: Panasonic Corporation, Osaka (JP)

(72) Inventor: Masayuki Toyama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/466,413

(22) Filed: Aug. 22, 2014

(65) Prior Publication Data

US 2014/0365697 A1 Dec. 11, 2014

Related U.S. Application Data

(63) Continuation of application No. PCT/JP2012/004754, filed on Jul. 26, 2012.

(30) Foreign Application Priority Data

Feb. 24, 2012 (JP) .................................. 2012-038462

(51) Int. Cl.
*G06F 13/24* (2006.01)
*G06F 9/48* (2006.01)

(52) U.S. Cl.
CPC .............. *G06F 13/24* (2013.01); *G06F 9/4812* (2013.01)

(58) Field of Classification Search
CPC ...... G06F 13/24; G06F 13/364; G06F 9/4812
USPC ........................... 710/110, 262; 709/208–211
See application file for complete search history.

(56) References Cited

U.S. PATENT DOCUMENTS 6,789,136 B1 * 9/2004 Dunstan ........................... 710/8
7,020,148 B1 3/2006 Yamamoto (Continued)

FOREIGN PATENT DOCUMENTS

JP 63-76043 4/1988
JP 6-214941 8/1994

(Continued)

OTHER PUBLICATIONS

International Search Report issued Oct. 23, 2012 in International (PCT) Application No. PCT/JP2012/004754.

*Primary Examiner* — Brian Misiura
(74) *Attorney, Agent, or Firm* — Wenderoth, Lind & Ponack, L.L.P.

(57) ABSTRACT

In a communication system, a master device gives a data control to one of a plurality of slave devices, and stops controlling data transmission and reception in the master device. A dual-role device executes the data transmission and reception with the other slave devices according to the data control given by the master device. The master device transmits an abort signal to the dual-role device while data is being transmitted and received by the dual-role device according to the data control. The dual-role device receives the abort signal from the master device, and transmits an interrupt signal to the master device when no data is being transmitted or received. The master device enables data transmission and reception according to the data control after receiving the interrupt signal from the dual-role device. The dual-role device stops data transmission and reception according to the data control after receiving the interrupt signal.

6 Claims, 27 Drawing Sheets

(56) References Cited

U.S. PATENT DOCUMENTS

| | | | |
|---|---|---|---|
| 7,395,362 B2 * | 7/2008 | Drexler et al. | 710/260 |
| 7,519,005 B2 * | 4/2009 | Hejdeman et al. | 370/252 |
| 2004/0158650 A1 | 8/2004 | Nakamura et al. | |
| 2004/0208200 A1 | 10/2004 | Hejdeman et al. | |
| 2006/0215703 A1 | 9/2006 | Honda | |
| 2007/0186020 A1 | 8/2007 | Drexler et al. | |
| 2010/0142418 A1 * | 6/2010 | Nishioka et al. | 370/282 |
| 2010/0202475 A1 | 8/2010 | Nakazumi | |
| 2014/0365595 A1 * | 12/2014 | Yamada et al. | 709/211 |

FOREIGN PATENT DOCUMENTS

| | | |
|---|---|---|
| JP | 11-232210 | 8/1999 |
| JP | 2001-156817 | 6/2001 |
| JP | 2002-305622 | 10/2002 |
| JP | 2002-351813 | 12/2002 |
| JP | 2006-268483 | 10/2006 |
| JP | 2012-10216 | 1/2012 |
| WO | 2009/050806 | 4/2009 |

\* cited by examiner

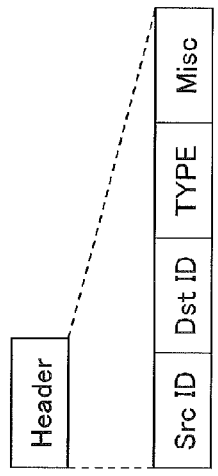
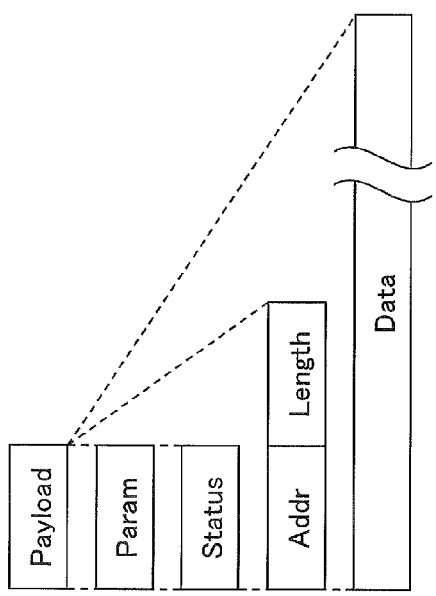
FIG. 7A
FIG. 7B
FIG. 7C
FIG. 7D

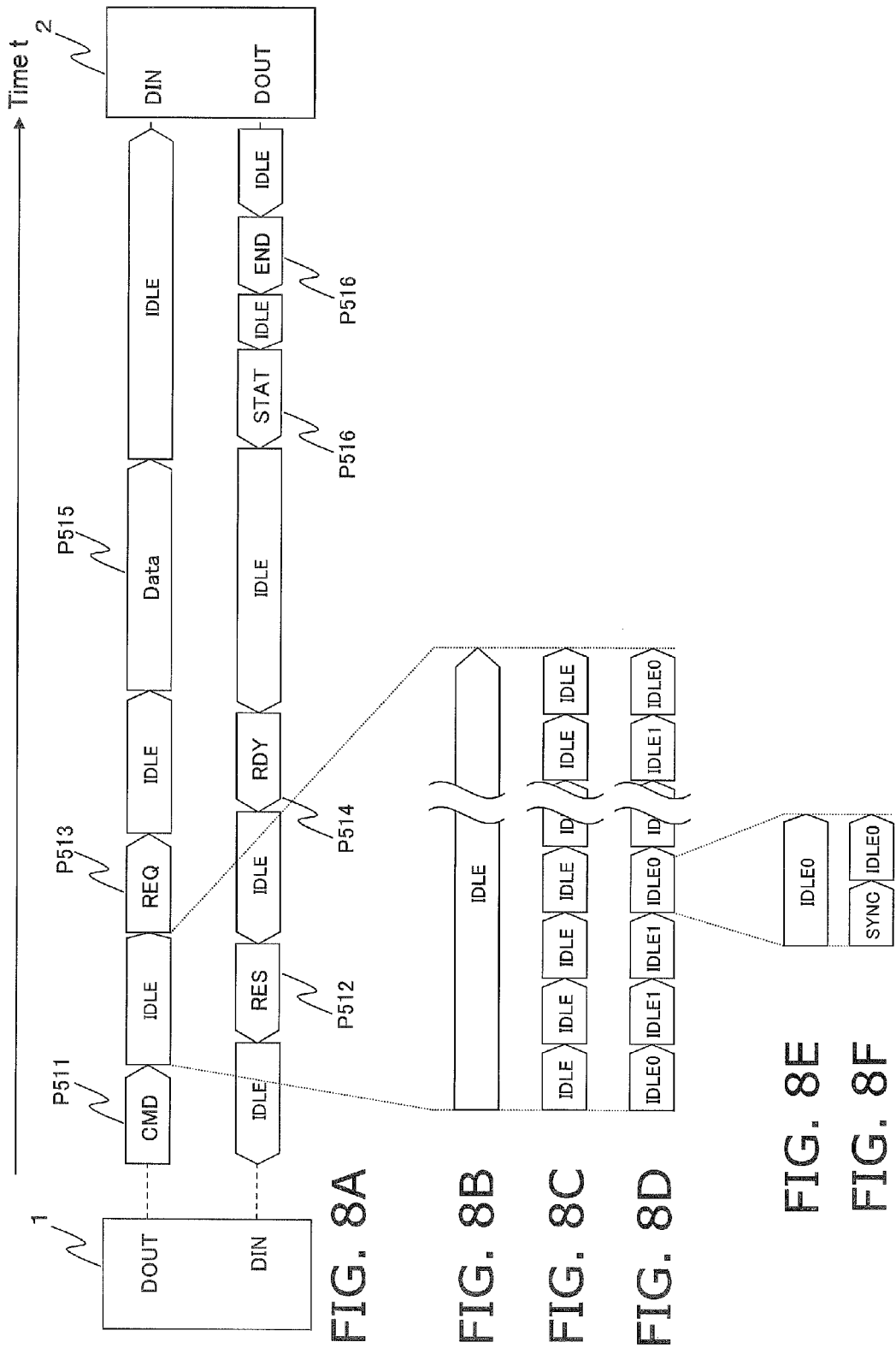

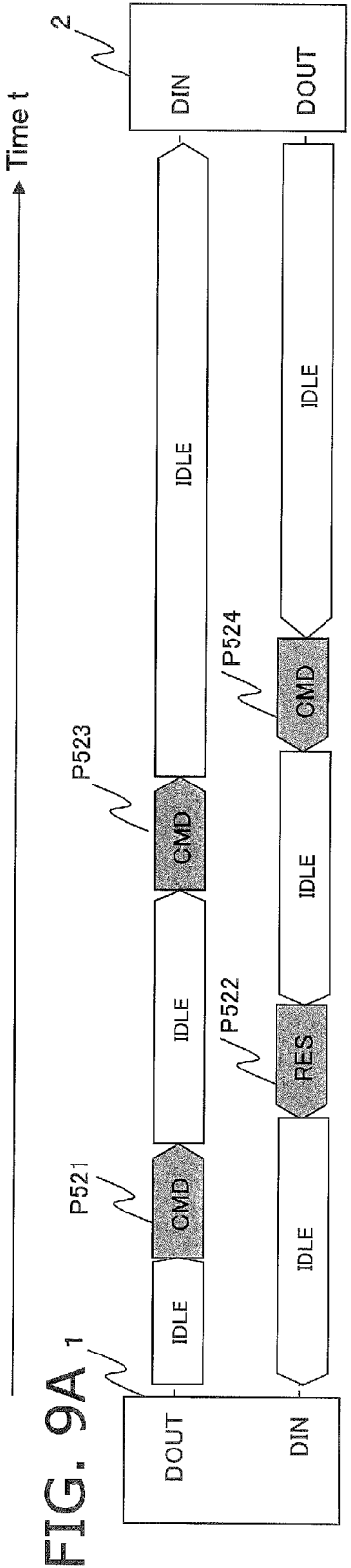
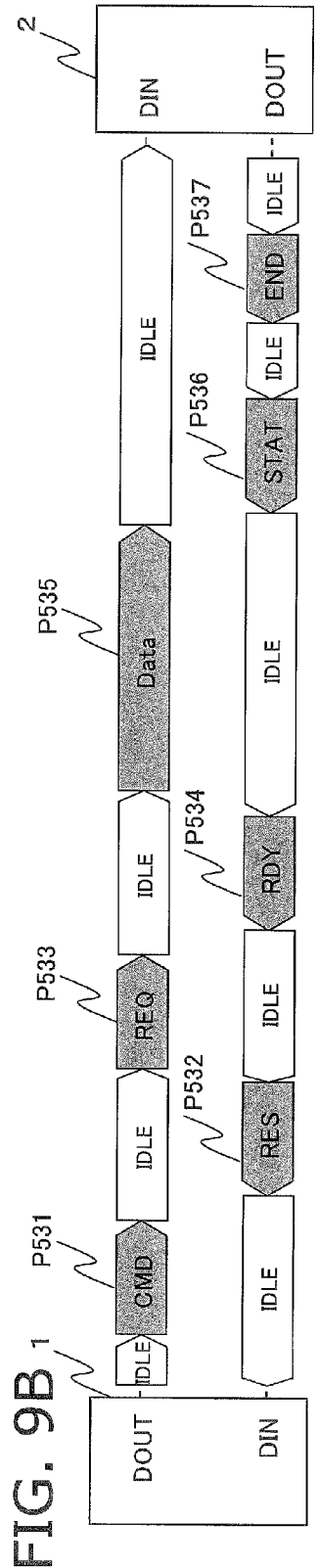
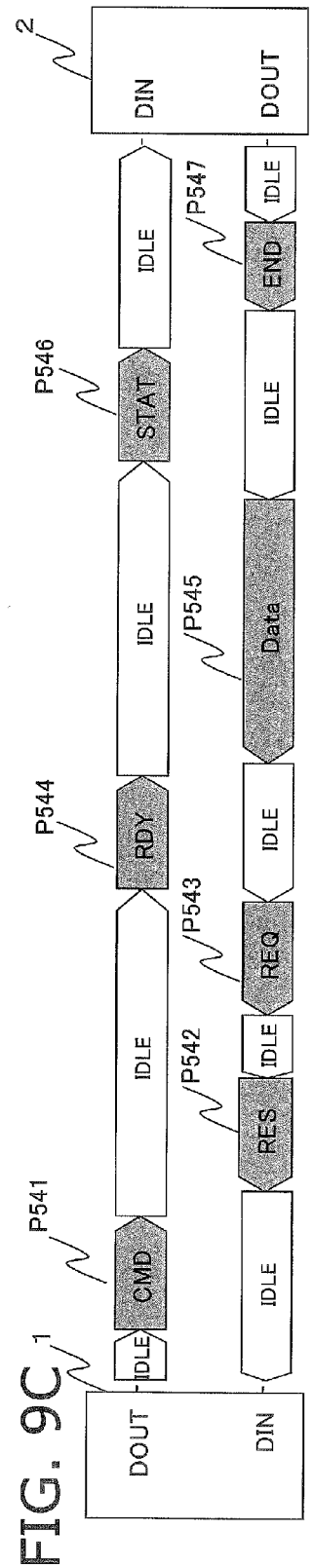

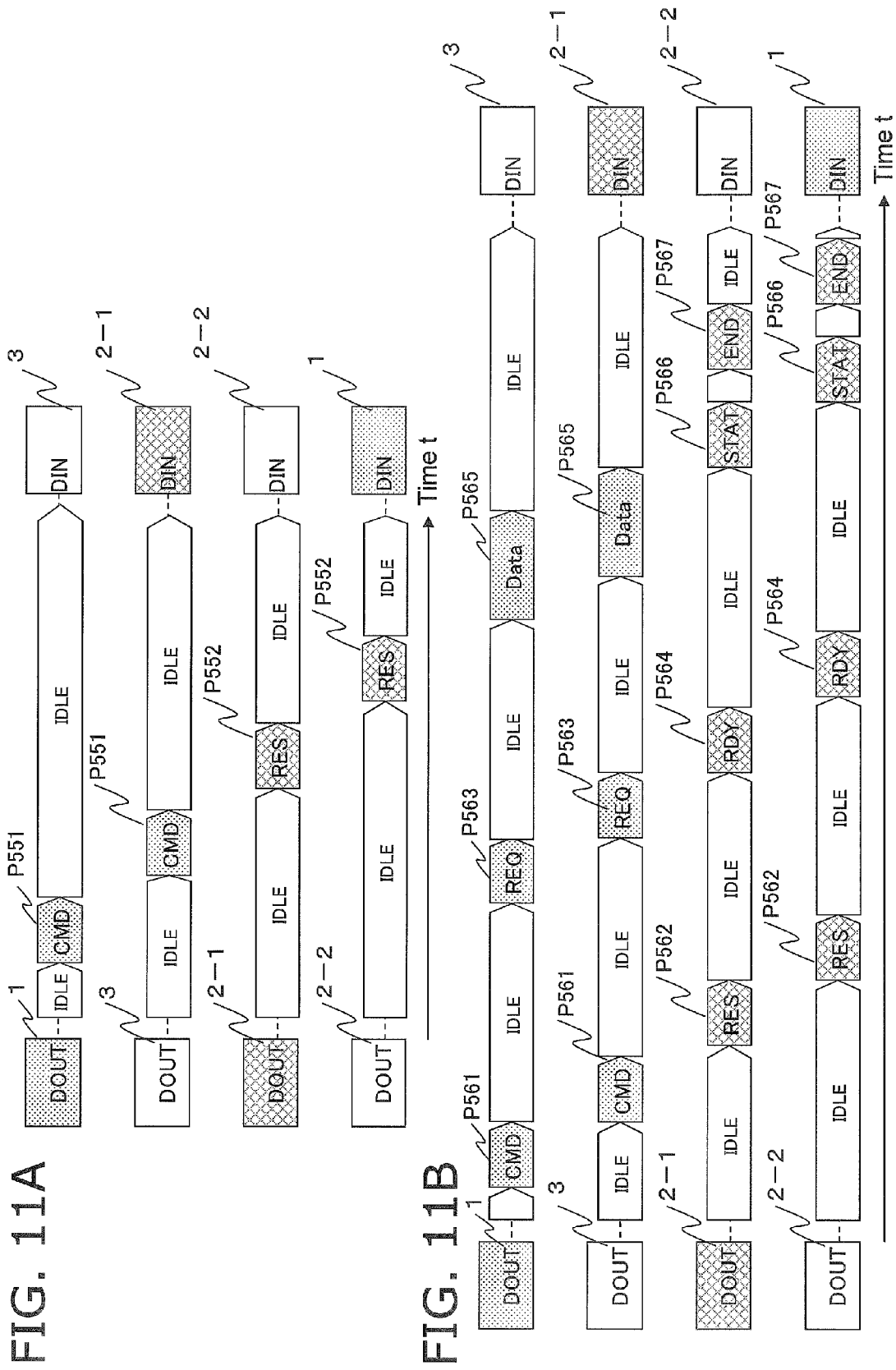

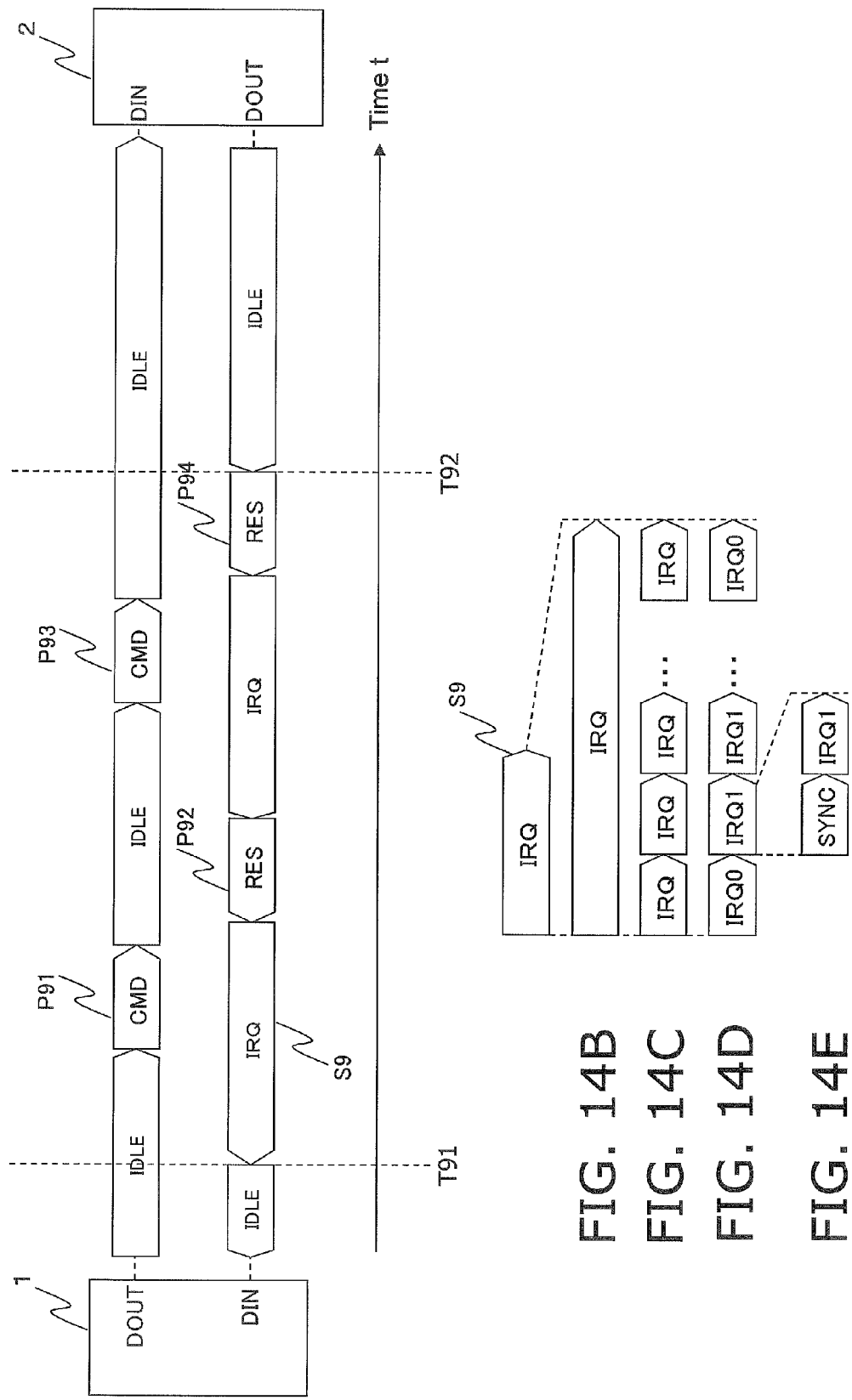

SLAVE DEVICE, MASTER DEVICE, COMMUNICATION SYSTEM, AND COMMUNICATION METHOD

PRIORITY

This is a continuation application under 35 U.S.C. §120 and 35 U.S.C. §365 of International Application PCT/JP2012/004754, with an international filing date of Jul. 26, 2012 which claims priority to Japanese Patent Application No. 2012-038462 filed on Feb. 24, 2012. The entire disclosures of International Application PCT/JP2012/004754 and Japanese Patent Application No. 2012-038462 are hereby incorporated herein by reference.

BACKGROUND

1. Technical Field

This disclosure relates to communication technology in which a master device is connected to one or more slave devices, and various kinds of information are exchanged as the slave devices respond to commands issued by the master device.

2. Background Art

There is a conventional communication system in which a plurality of devices having a master function of controlling transmission and reception of data are connected on a bus (a communication line), and various kinds of information are exchanged between the devices. With such a communication system, the control of a bus (hereinafter referred to as bus control) has to be determined between a plurality of devices having such a bus master function so that only one of the devices has the bus control at a time.

For example, FIG. 27 shows a communication system disclosed in US 20070186020 A1, in which a plurality of devices having a bus master function are connected by a bus. With this communication system, first, the device requesting the bus control embeds a bus control request in a response to a bus transaction from the device having the bus control. The device that detects the request then permits the device requesting the bus control to use the bus control after completion of the transaction.

In the example shown in FIG. 27, devices 1201a to 1201d having a bus master function are connected by a bus, and the device 1201a has the bus control. If the device 1201b requests the bus control, the device 1201b embeds a bus control request BusREQ in a response P122 to a bus transaction request P121 from the device 1201a. The device 1201a permits the device 1201b to use the bus control once it recognizes the bus control request included in the received response P122.

SUMMARY

Technical Problem

With the prior art discussed above, when a device that does not have the bus control requests the bus control, a request must be embedded in a response to a transaction from the device having the bus control. Then, the bus control cannot be requested if there is no transaction from the device having the bus control. Therefore, a problem is that responsiveness gets low when a device not having the bus control wants to obtain the bus control to execute a bus transaction.

It is therefore an object of this disclosure to provide a communication system that is highly responsive, as well as a slave device, a master device, and a communication method used for the communication system.

Solution to Problem

The slave device disclosed herein is configured to be connected to a master device and one or more other slave devices via a first communication line. The master device is configured to manage a data control enabling execution of controlling data transmission and reception on the first communication line. The slave device comprises a data input terminal and a data output terminal The data input terminal is connected to the first communication line and configured to receive data from the master device or the one or more other slave devices. The data output terminal is connected to the first communication line and configured to transmit data to the master device or the one or more other slave devices. While controlling data transmission and reception according to the data control given by the master device, if the slave device receives an abort signal from the master device in a state where the data input terminal is not receiving data and the data output terminal is not transmitting data, the slave device transmits an interrupt signal to the master device. After transmitting the interrupt signal to the master device, the slave device halts controlling the data transmission and reception according to the data control.

The master device disclosed herein is configured to be connected to one or more slave devices via a first communication line and is configured to manage a data control which enables execution of controlling data transmission and reception on the first communication line. The master device comprises a data input terminal and a data output terminal The data input terminal is connected to the first communication line and configured to receive data from the one or more other slave devices. The data output terminal is connected to the first communication line and configured to transmit data to the one or more other slave devices, The master device provides the data control to a first slave device out of the one or more slave devices, stops controlling the data transmission and reception of the master device itself, and transmits an abort signal to the first slave device while the first slave device is executing data transmission and reception according to the data control provided to the first slave device. After transmitting the abort signal and receiving an interrupt signal from the first slave device, the master device enables the execution of controlling the data transmission and reception according to the data control.

The communication system disclosed herein comprises a first communication line, a master device configured to manage a data control that enables execution of controlling data transmission and reception on the first communication line, and one or more slave devices connected to the master device via the first communication line. The master device includes a first data input terminal connected to the first communication line and configured to receive data from the one or more slave devices, and a first data output terminal connected to the first communication line and configured to transmit data to the one or more slave devices. The one or more slave devices includes a second data input terminal connected to the first communication line and configured to receive data from one other slave device or the master device, and a second data output terminal connected to the first communication line and configured to transmit data to the one other slave device or the master device. The master device provides the data control to a first slave device out of the one or more slave devices, stops controlling the data transmission and reception, and transmits an abort signal to the first slave device while the first slave device is executing data transmission and reception according to the data control provided to the first slave device. The first slave device receives the abort signal from the master device, and transmits an interrupt signal to the master device in a state where the second data input terminal is not receiving data and the second data output terminal is not transmitting data. After receiving the interrupt signal from the first slave device, the master device enables the execution of controlling the data transmission and reception according to the data control. After transmitting the interrupt signal to the master device, the first slave device halts controlling the data transmission and reception according to the data control.

The communication method disclosed herein is a communication method using the above-mentioned communication system.

In this disclosure, what is called a "signal" is not limited to the signal itself It also encompasses the sense of data having a specific format (such as packet data).

With the technology disclosed herein, even when data is exchanged between a slave device having a data control and another slave device, the master device can request and acquire a return of the data control. Therefore, the responsiveness of the communication system can be improved.

BRIEF DESCRIPTION OF DRAWINGS

FIGS. 7A to 7D show the format of a packet;

FIGS. 8A to 8F illustrate the configuration of an idle signal;

FIGS. 9A to 9C illustrate command, response, and data transmission and reception in one-to-one connection;

FIGS. 11A and 11B illustrate command, response, and data transmission and reception in a ring connection;

FIGS. 14A to 14E illustrate interrupt processing using a data signal line;

DETAILED DESCRIPTION

Figure 1:
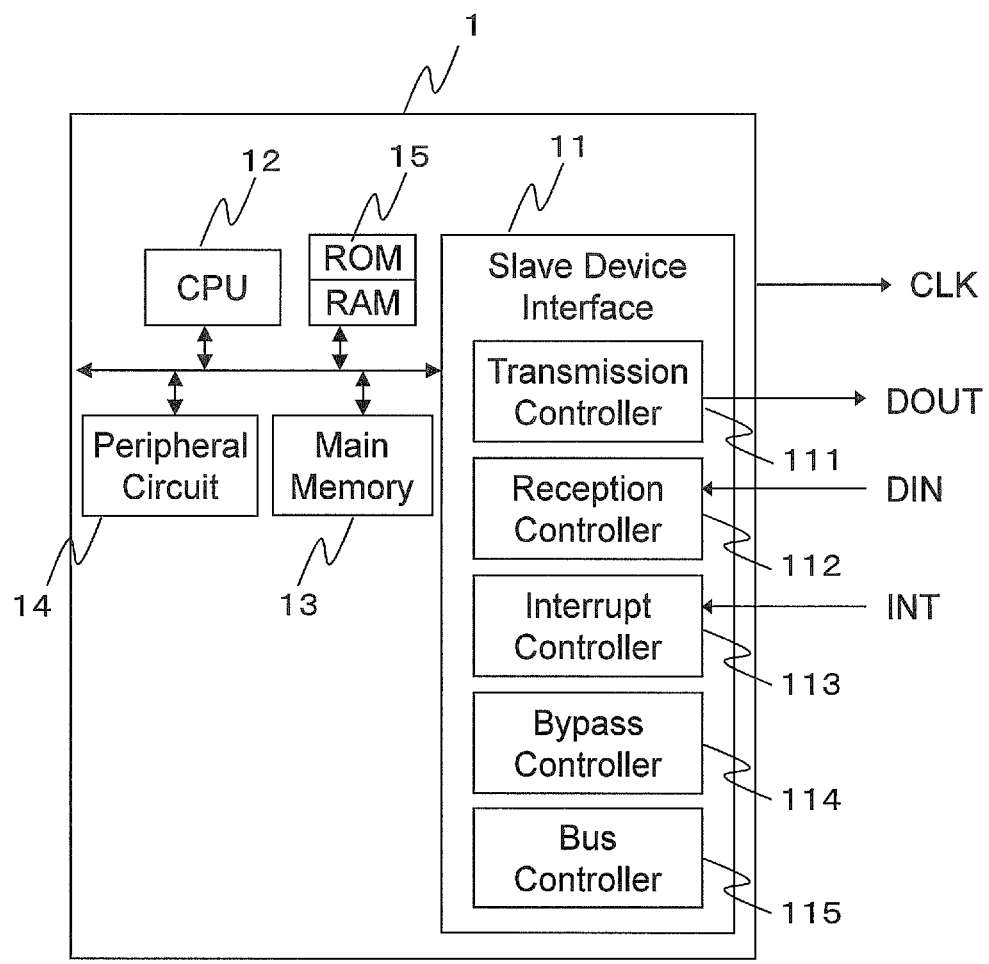
FIG. 1 is a simplified diagram of the configuration of the master device pertaining to Embodiment 1.

Embodiments will now be described in detail through reference to the drawings as needed. However, unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The inventors have provided the appended drawings and the following description so that a person skilled in the art might fully understand this disclosure, but do not intend for these to limit what is discussed in the patent claims.

Unless otherwise specified, codes, symbols, and numbers that are the same in the description refer to the same constituent elements. Also, unless otherwise specified, constituent elements that are not essential to the present invention are not depicted in the drawings.

Embodiment 1
1-1. Configuration of Communication System

Figure 2:
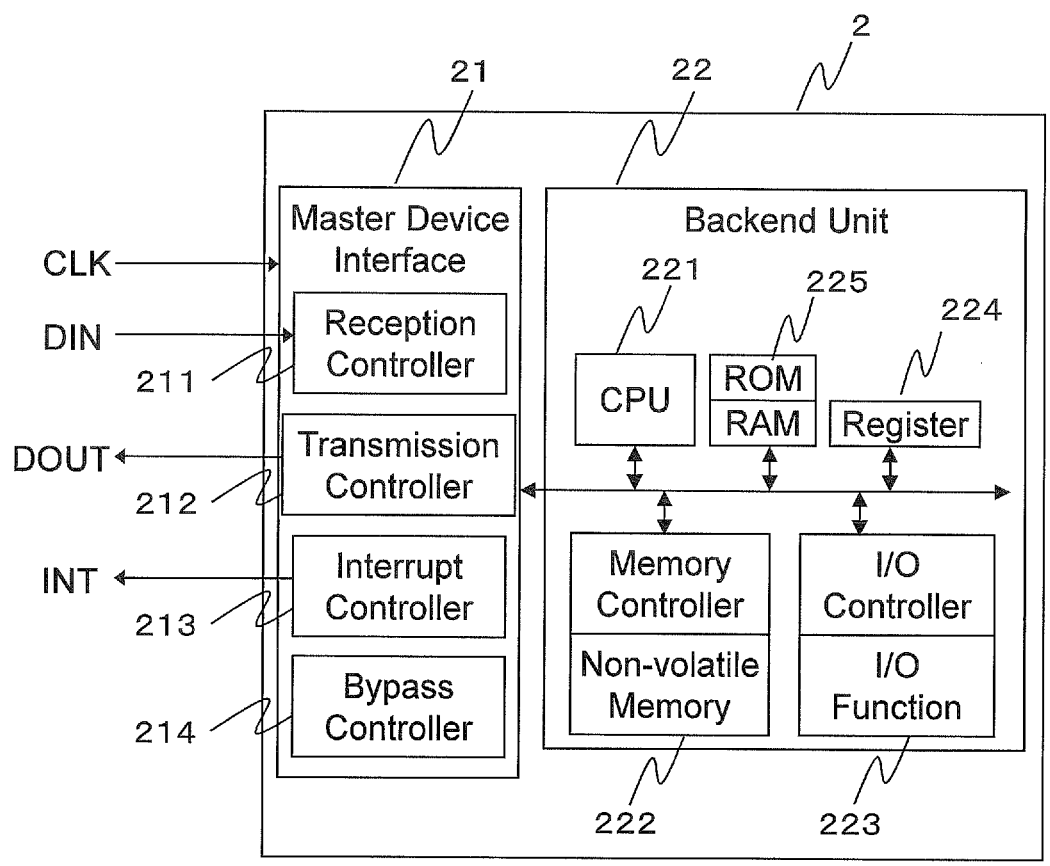
FIG. 2 is a simplified diagram of the configuration of the slave device pertaining to Embodiment 1.

The communication system pertaining to this embodiment includes a master device 1 (FIG. 1) and at least one slave device 2 (FIG. 2).

1-1-1. Configuration of Master Device

FIG. 1 is a simplified diagram of the configuration of the master device 1 included in the communication system pertaining to this embodiment. The master device 1 manages a bus control (an example of a data control) in a bus (an example of a first communication line) connected to the slave device 2. The bus control enables controlling transmission and reception of data including control signals, commands and responses to the commands, user data, and so forth. The management of the bus control includes the possession of the bus control, the transfer of the bus control between master device and slave devices, etc.

As shown in FIG. 1, the master device 1 includes a slave device interface 11 (an example of a transceiver), a CPU 12, a main memory component 13, a peripheral circuit 14, and a ROM/RAM 15. The CPU 12, the main memory component 13, and the ROM/RAM 15 make up a controller (an example of a controller) that executes processing on data received from the slave device interface 11.

The slave device interface 11 is connected to a plurality of input/output terminals for communicating with the slave device 2. These input/output terminals include a CLK terminal that outputs clock signals, a DOUT terminal (an example of a data output terminal) that outputs data, a DIN terminal (an example of a data input terminal) that inputs data, and an INT input terminal (an example of an interrupt input terminal) that inputs interrupt signals. The slave device interface 11 has a transmission controller 111 that transmits data via the DOUT terminal, a reception controller 112 that receives data via the DIN terminal, and an interrupt controller 113 that receives interrupt signals from the slave device 2 via the INT input terminal The function of generating clock signals (CLK signals) transmitted via the CLK terminal can be achieved with specific known technology, and as such will not be described here.

The CLK, DOUT, DIN, and INT signal lines are transmission lines for transmitting signals by, for example, differential signaling or single-ended signaling. The number of signal lines for transmitting and receiving data is not limited to two (DOUT and DIN), and more signals lines may be used such as four signal lines of DOUT0 to DOUT3 or DIN0 to DIN3, or eight signal lines of DOUT0 to DOUT7 or DIN0 to DIN7. Using more signal lines allows the master device 1 to communicate at higher speed. Also, the number of signal lines for transmitting data to the slave device 2 may be the same as the number of signal lines for receiving data from the slave device 2, or the numbers may be different. Also, the number of signal lines INT for receiving interrupt signals from the slave device 2 is not limited to one, and more signal lines may be provided (such as four (INT0 to INT3)). As will be discussed below, it is also possible to use a configuration in which no signal line INT is used, and interrupt signals and data are instead received using the signal line DIN.

The slave device interface 11 of the master device 1 also comprises a bypass controller 114 that executes a bypass function (discussed below), and a bus controller 115 that issues commands to acquire or return the bus control.

1-1-2. Configuration of Slave Device

FIG. 2 is a simplified diagram of the configuration of the slave device 2 included in the communication system pertaining to this embodiment. As shown in FIG. 2, the slave device 2 includes a master device interface 21 (an example of a transceiver) and a backend unit 22 (an example of a controller).

The backend unit 22 has a CPU 221, a memory component 222 that includes a nonvolatile memory and a memory controller, an I/O (input/output) component 223 that includes an I/O function and an I/O controller, a register 224, and a ROM/RAM 225. The I/O function includes, for example, various kinds of wireless communication and wired communication.

The slave device 2 may have a configuration that does not include either one of the memory component 222 or the I/O component 223, or both.

The master device interface 21 is connected to a plurality of input/output terminals for communicating with the master device 1. These input/output terminals include a CLK terminal that inputs clock signals, a DOUT terminal (an example of a data output terminal) that outputs data, a DIN terminal (an example of a data input terminal) that inputs data, and an INT output terminal (an example of an interrupt output terminal) that outputs interrupt signals. The master device interface 21 has a reception controller 211 that receives data via the DIN terminal, a transmission controller 212 that transmits data via the DOUT terminal, and an interrupt controller 213 that transmits interrupt signals to the master device 1 via the INT output terminal The CLK, DOUT, DIN, and INT signal lines are transmission lines for transmitting signals by, for example, differential signaling or single-ended signaling. The number of signal lines for transmitting and receiving data is not limited to two (DOUT and DIN), and more signals lines may be used such as four signal lines of DOUT0 to DOUT3, or signal lines of DOUT0 to DOUT7. Using more signal lines allows the slave device 2 to communicate at higher speed. Also, the number of signal lines for transmitting data to the master device may be the same as the number of signal lines for receiving data from the master device, or the numbers may be different. Also, the number of signal lines for sending an interrupt to the master device 1 is not limited to one, and more signal lines may be provided (such as four (INT0 to INT3)). As will be discussed below, it is also possible to use a configuration in which no signal line INT is used, and interrupt signals and data are instead transmitted using the signal line DOUT. Furthermore, the configuration may be such that the interrupt controller 213 is not included, and no interrupt is sent to the master device 1.

The master device interface 21 of the slave device 2 also comprises a bypass controller 214 that executes a bypass operation (discussed below).

1-1-3. Configuration of Dual-Role Device

Figure 3:
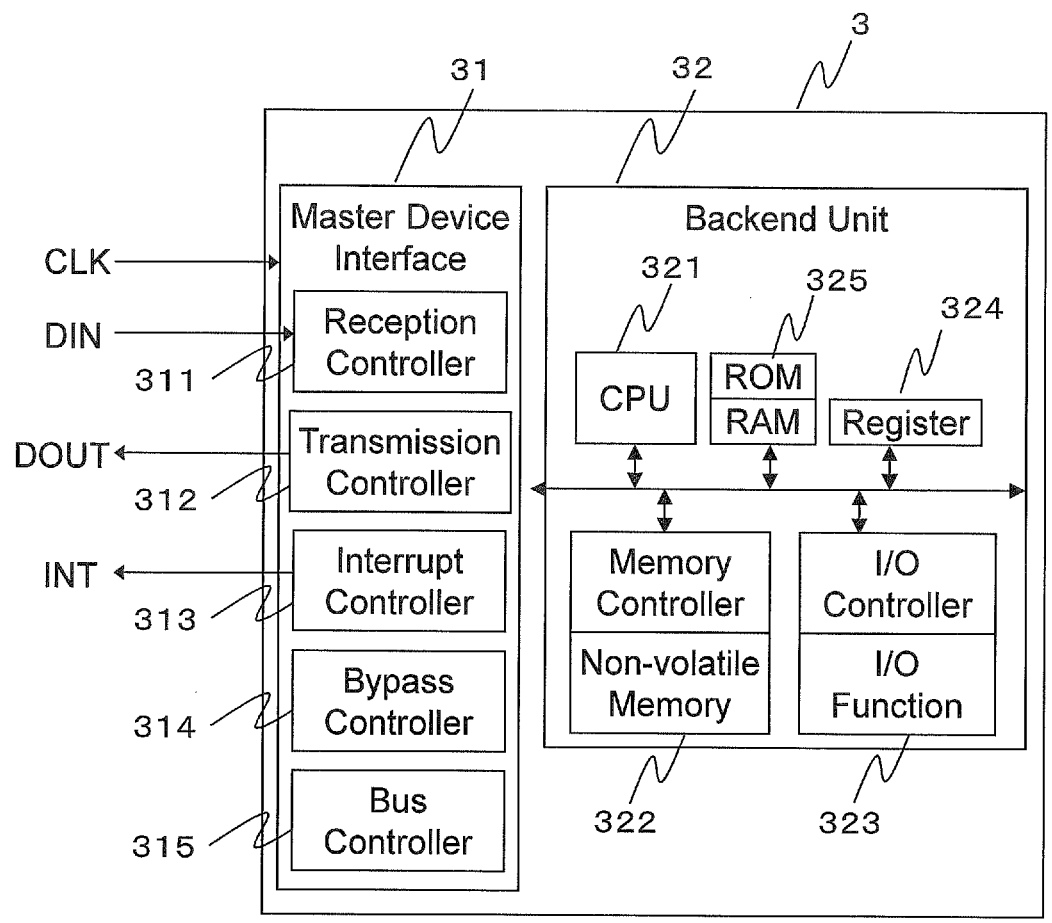
FIG. 3 is a simplified diagram of the configuration of the dual-role device pertaining to Embodiment 1.

FIG. 3 is a simplified diagram of the configuration of the dual-role device 3 included in the communication system pertaining to this embodiment.

The dual-role device 3 usually operates as the slave device 2, and as discussed below, it can also obtain the bus control under an instruction from the master device 1, so that it executes a function of controlling transmission and reception of various kinds of data with other slave devices 2. As shown in FIG. 3, the dual-role device 3 includes a master device interface 31 (an example of a transceiver) and a backend unit 32 (an example of a controller).

The backend unit 32 includes a CPU 321, a memory component 322 that includes a nonvolatile memory and a memory controller, an I/O (input/output) component 323 that includes an I/O function and an I/O controller, a register 324, and a ROM/RAM 325. The I/O function includes, for example, various kinds of wireless communication and wired communication. Also, the dual-role device 3 may have a configuration that does not include the memory component 322 or the I/O component 323, or either one.

The master device interface 31 is connected to a plurality of input/output terminals for communicating with the master device 1. These input/output terminals include a CLK terminal that inputs clock signals, a DOUT terminal (an example of a data output terminal) that outputs data, a DIN terminal (an example of a data input terminal) that inputs data, and an INT output terminal (an example of an interrupt output terminal) that outputs interrupt signals. The master device interface 31 has a reception controller 311 that receives data via the DIN terminal, a transmission controller 312 that transmits data via the DOUT terminal, and an interrupt controller 313 that transmits interrupt signals to the master device 1 via the INT output terminal The CLK, DOUT, DIN, and INT signal lines are transmission lines for transmitting signals by, for example, differential signaling or single-ended signaling. The number of signal lines for transmitting and receiving data is not limited to two (DOUT and DIN), and more signals lines may be used such as four signal lines of DOUT0 to DOUT3, or signal lines of DOUT0 to DOUT7. Using more signal lines allows the dual-role device 3 to communicate at higher speed.

Also, the number of signal lines for transmitting data to the master device 1 may be the same as the number of signal lines for receiving data from the master device 1, or the numbers may be different. Also, the number of signal lines for sending an interrupt signal to the master device 1 is not limited to one, and more signal lines may be provided such as four (INT0 to INT3). As will be discussed below, it is also possible to use a configuration in which no signal line INT is used, and interrupt signals and data are instead transmitted using the signal line DOUT.

The master device interface 31 of the dual-role device 3 further comprises a bypass controller 314 that executes a bypass operation (discussed below), and a bus controller 315 that executes bus control acquisition and return control.

With the master device 1, the slave device 2, and the dual-role device 3 in this embodiment, the clock line CLK consists of a different terminal from that of the signal line DOUT or the signal line DIN, but this is not the only option. An embedded clock that overlaps a clock with a signal line can also be used, for example. In this case, the clock lines CLK and the CLK terminals of the master device 1, the slave device 2, and the dual-role device 3 are not necessary.

1-1-4. Connection of Master Device, Slave Device, and Dual-Role Device

FIGS. 4A, 4B, 5A, 5B, 6A and 6B illustrate the connections between master device 1, the slave device 2, and the dual-role device 3 in the communication system pertaining to this embodiment.

Figure 4B:
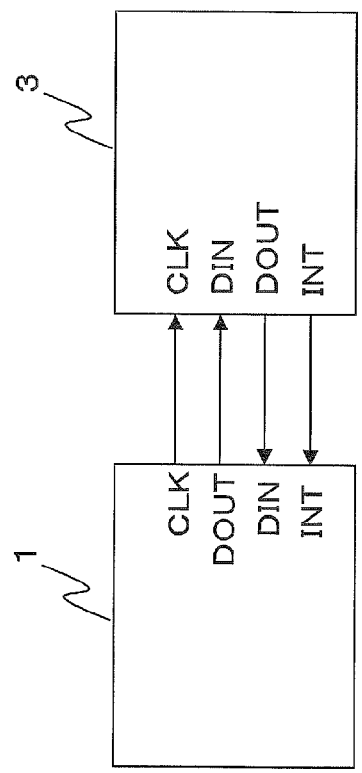
FIGS. 4A and 4B illustrate the connection between master device and slave device, and the connection between master device and dual-role device.
Figure 4A:
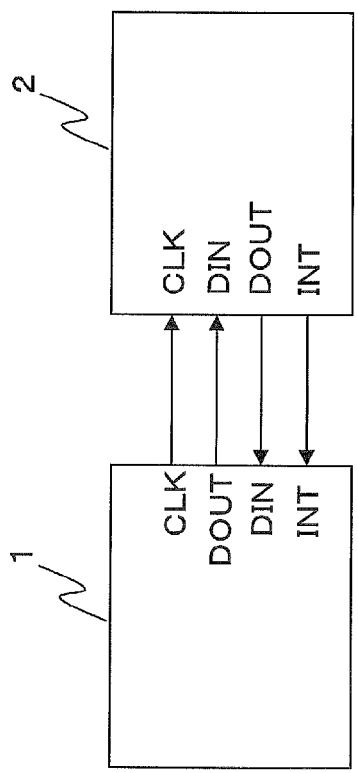

FIG. 4A shows a case in which the master device 1 and one slave device 2 are connected one-to-one. FIG. 4b shows a case in which the master device 1 and one dual-role device 3 are connected one-to-one.

Figure 5B:
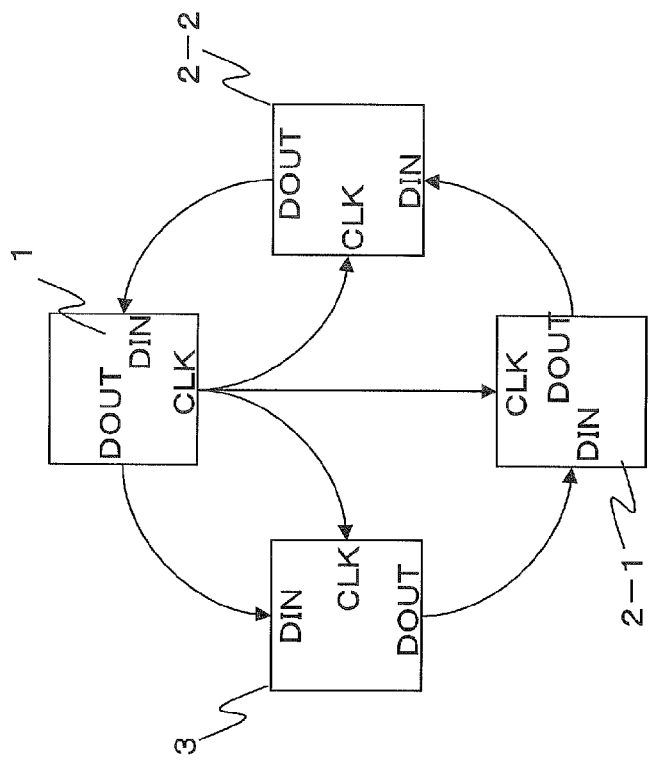
FIGS. 5A and 5B illustrate the connection of clock signal lines between master device, slave device and dual-role device.
Figure 5A:
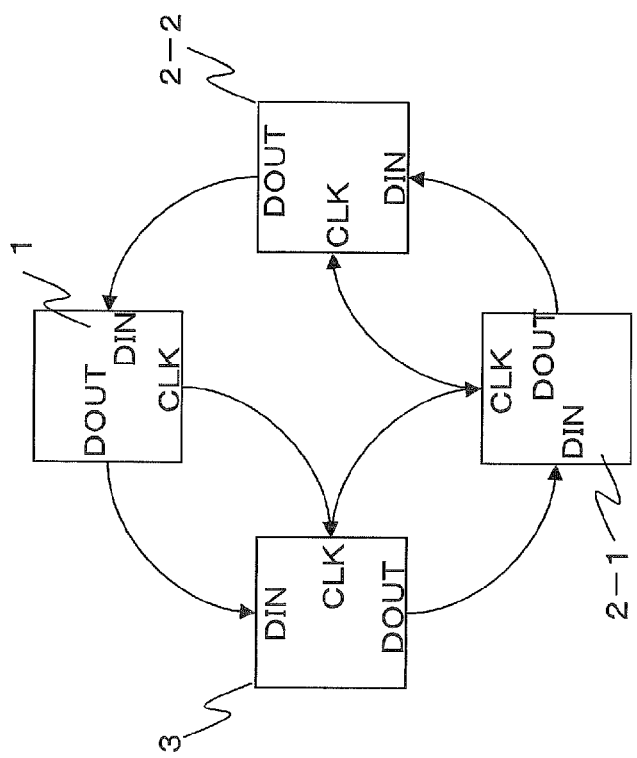

FIGS. 5A and 5B show configurations in which the master device 1, a plurality of slave devices 2-1 and 2-2, and a dual-role device 3 are connected in a ring. The slave devices 2, 2-1, and 2-2 and the dual-role device 3 may be devices having the same I/O component and memory, or a different I/O component and memory may be provided for each device.

In any case, with the master device 1, the slave devices 2, 2-1, and 2-2, and the dual-role device 3, various kinds of data are transmitted from the signal line DOUT, and various kinds of data are received by the signal line DIN.

FIGS. 5A and 5B show the connections in the communication system pertaining to this embodiment, and particularly those of transmission lines for clock (CLK) signals. CLK signals are transmitted from the master device 1 to the slave devices 2-1 and 2-2 and the dual-role device 3. As shown in FIG. 5A, a CLK signal may be transmitted from the master device 1 to the slave devices 2-1 and 2-2 and the dual-role device 3 in multi-drop connection. Or, as shown in FIG. 5B, the CLK signal may be transmitted from the master device 1 that is connected to the slave devices 2-1 and 2-2 and the dual-role device 3 in a star topology. As discussed above, an embedded clock may be used, and the clock signal CLK omitted.

Figure 6B:
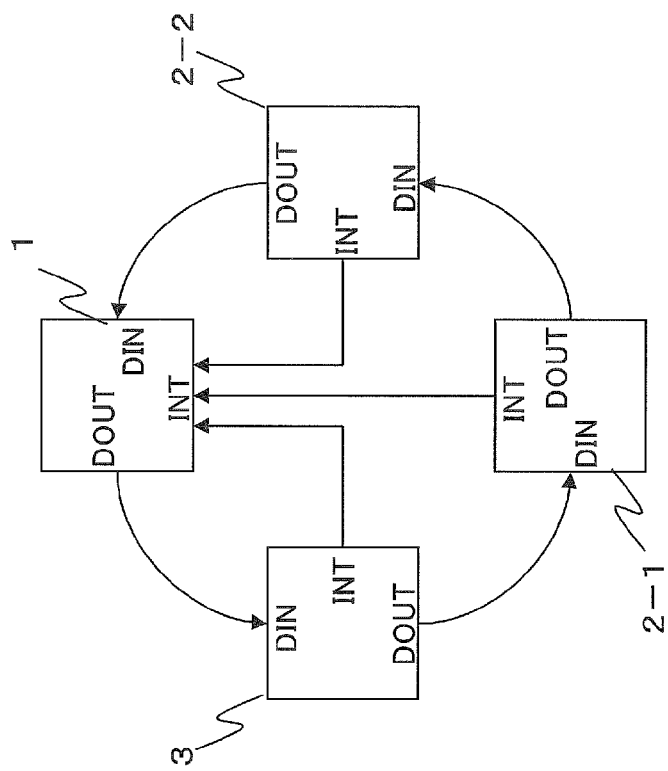
FIGS. 6A and 6B illustrate the connection between interrupt signal lines between master device, slave device and dual-role device.
Figure 6A:
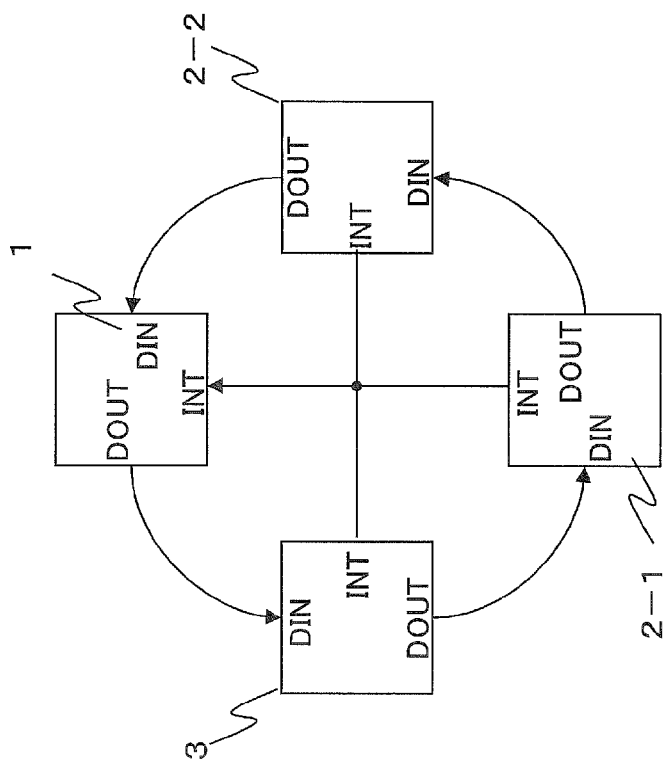

FIGS. 6A and 6B show the connections of transmission lines for interrupt signal (INT signals) in the communication system pertaining to this embodiment. The interrupt signals are transmitted as interrupt notifications from the slave devices 2-1 and 2-2 and the dual-role device 3 to the master device 1. As shown in FIG. 6A, a plurality of interrupt signals from the slave devices 2-1 and 2-2 and the dual-role device 3 may be combined into a single interrupt signal using wired OR, for example and transmitted to the master device 1. Alternatively, as shown in FIG. 6B, the master device 1 may have a plurality of INT input terminals, and interrupt signals from the slave devices 2-1 and 2-2 and the dual-role device 3 may be transmitted to the respective INT input terminals of the master device 1. FIGS. 6A and 6B may also be combined so that a signal into which interrupt signals from the slave devices 2-1 and 2-2 are combined, and an interrupt signal from the dual-role device 3 are transmitted to different INT input terminals of the master device 1, for example.

1-2. Operation of Communication System

The operation of the communication system pertaining to this embodiment and configured as above will now be described.

1-2-1. Packet Format

FIGS. 7A to 7D show an example of the packet format used in communication by the master device 1 and the slave devices 2, 2-1, and 2-2 and the dual-role device 3 in the communication system pertaining to this embodiment.

FIG. 7A shows a packet format for transmitting and receiving commands and responses to and from the master device 1, the slave devices 2, 2-1, and 2-2, and the dual-role device 3. This packet is made up of a start signal (Start), a header (Header), a payload (Payload), a CRC, and an end signal (End).

FIG. 7B shows a packet format for transmitting and receiving user data to and from the master device 1, the slave devices 2, 2-1, and 2-2, and the dual-role device 3. Each data packet is made up of a start signal (Start), a header (Header), a payload (Payload), a CRC, and an end signal (End), and the configuration is such that a plurality of data packets are put between a data burst start signal (BS) and a data burst end signal (BE).

FIG. 7C shows the configuration of the header. The header includes a transmission source information (Src ID) for the packet, transmission destination information (Dst ID) for the packet, the packet type (TYPE), and other control information (Misc). The Src ID is an identifier indicating the transmission source device, and the Dst ID is an identifier indicating the transmission destination device, with different values assigned to each device. The TYPE indicates the packet type, such as command, response, or user data. Misc includes transaction IDs, packet format version numbers, protocol types, and so forth. The master device 1, the slave devices 2, 2-1, and 2-2, and the dual-role device 3 execute transmission and reception control over packets on the basis of header information.

FIG. 7D shows the configuration of a payload. When the packet type is a command or a response, the payload includes parameters (Param) and the status of each device. In the case of a command to execute data transfer, the payload includes the transfer start address (Addr) and the transferred data length. When the packet type is user data, the payload includes a data payload.

The master device 1, the slave devices 2, 2-1, and 2-2, and the dual-role device 3 use packets configured with these formats to transfer various kinds of information.

1-2-2. Idle Signal

FIGS. 8A to 8F show the configuration of an idle signal in the communication system pertaining to this embodiment. An idle signal is a control signal that is sent to the bus when no packet is being transmitted or received on the bus connecting the master device 1, the slave devices 2, 2-1, and 2-2, and the dual-role device 3. As shown in FIG. 8A, the idle signal flows during the period when packets P511, P512, P513, P514, P515, P516, and P517 are not being transmitted between the master device 1 and the slave device 2.

As shown in FIG. 8B, the idle signal is configured to maintain a single state (such as "1" or "0"). Alternatively, as shown in FIG. 8C, the idle signal may be configured so that a single symbol (such as a symbol with 8b/10b encoding on a differential transmission path) is sent repeatedly. Alternatively, as shown in FIG. 8D, the idle signal can be configured so that a plurality of symbols are sent repeatedly (such as periodically or randomly sending two symbols, IDLE0 and IDLE1). Furthermore, with a configuration in which a symbol is sent repeatedly as shown in FIGS. 8C and 8D, a single symbol IDLE0 may be sent as shown in FIG. 8E, or a set of symbols (SYNC and IDLE0, or SYNC and IDLE1) may be sent as shown in FIG. 8F. With the configuration in FIG. 8F, even when no packets are being transmitted or received on the bus, the symbol SYNC for maintaining synchronization of the clock CLK and the reception data DIN can be sent between the master device 1, the slave device 2, and the dual-role device 3, making reliable communication possible.

1-2-3. Operation with Point-to-Point Connection

FIGS. 9A to 9C illustrate command, response, and user data transmission and reception versus time t when the master device 1 and the slave device 2 are connected one-to-one in the communication system pertaining to this embodiment. The operation is the same when the dual-role device 3 is connected instead of the slave device 2.

FIG. 9A is a diagram showing a case in which the master device 1 and the slave device 2 send and receive commands and responses. As shown in FIG. 9A, when the master device 1 transmits a command (hereinafter referred to as CMD) packet P521, the slave device 2 receives the P521 and transmits a response (hereinafter referred to as RES) packet P522 to the master device 1. The processing indicated by the CMD includes initialization, resetting, register reading and writing, and the acquisition of status information. The information contained in the RES includes, for example, the result of the operation indicated by the CMD, the internal status of the slave device 2, and register values. Alternatively, as shown in FIG. 9A, upon receiving the CMD packet P523 transmitted by the master device 1, the slave device 2 may first process the received CMD and then transmit the CMD packet P524 again. In this case, P524 may be the same as P523, or it may include the header or payload with a value updated on the basis of the result of operation of the CMD for the P523 by the slave device 2.

FIG. 9B is a diagram showing a case in which the master device 1 writes data to the slave device 2. As shown in FIG. 9B, the master device 1 transmits to the slave device 2 a CMD packet P531 instructing the writing of data. Upon receiving the P531, the slave device 2 transmits the RES packet P532 to the master device 1. When the master device 1 receives the P532, it sends the slave device 2 a data transfer request (hereinafter referred to as REQ) packet P533. After receiving the P533, the slave device 2 sends the master device 1 a data transfer ready (hereinafter referred to as RDY) packet P534 if the state of the slave device 2 allows the reception of write data. Upon receiving the P534, the master device 1 sends the slave device 2 a data burst P535. Upon receiving the P535, the slave device 2 determines whether or not the received data contains any error, and sends the master device 1 a status information (hereinafter referred to as STAT) packet P536. Upon receiving the P536, the master device 1 determines whether data writing succeeded or failed. The transmission and reception of packets in P533 to P536 is then repeated until the master device 1 completes the desired data writing, after which the slave device 2 sends the master device 1 a data write completion notification (hereinafter referred to as END) packet P537. The master device 1 concludes data write processing upon receipt of the P537.

FIG. 9C is a diagram showing a case in which the master device 1 reads data from the slave device 2. As shown in FIG. 9C, the master device 1 sends the slave device 2 a CMD packet P541 instructing the reading of data. Upon receiving the P541, the slave device 2 sends the master device 1 a RES packet P542, and then sends a REQ packet P543. After receiving the P542 and the P543, the master device 1 sends the slave device 2 a RDY packet P544 if the state allows the reception of read data. Upon receiving the P544, the slave device 2 sends out a data burst P545. Upon receiving the P545, the master device 1 determines whether or not the received data contains any errors, and sends the slave device 2 a STAT packet P546. Upon receiving the P546, the slave device 2 determines whether the reading of data succeeded or failed. The transmission and reception of packets in P543 to P546 is then repeated until the master device 1 completes the desired data reading, after which the slave device 2 sends the master device 1 an END packet P547. The master device 1 concludes data read processing upon receipt of the P547.

Thus, packets including commands, responses, data, and so for can be exchanged and various kinds of information transferred between the master device 1 and the slave device 2.

1-2-4. Operation with Ring Connection

Figure 10:
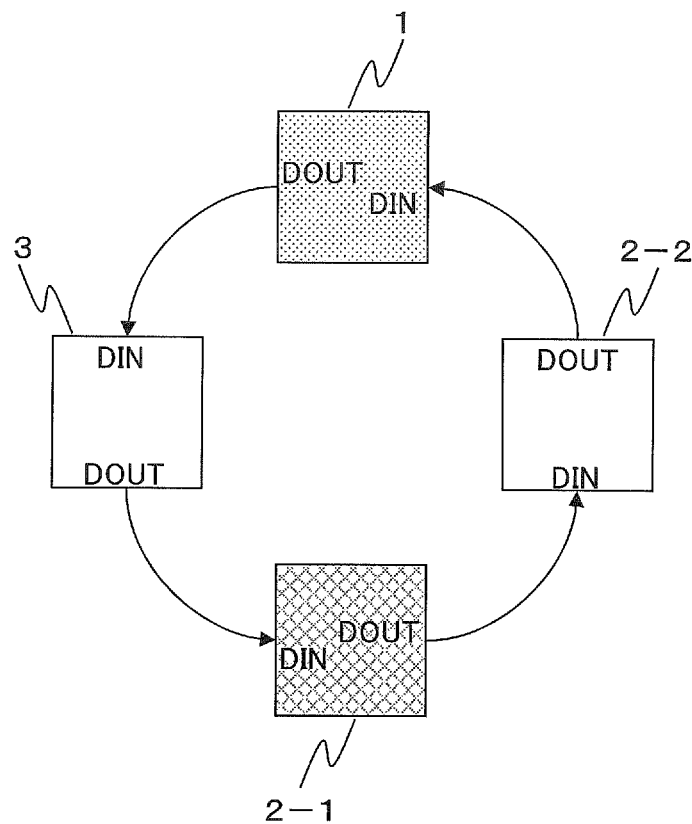
FIG. 10 illustrates the connection of data signal lines in a ring connection.

FIG. 10 shows the connection state of data signal lines when the master device 1, a plurality of slave devices 2-1 and 2-2, and the dual-role device 3 are connected in a ring in the communication system pertaining to this embodiment. The number of slave devices and dual-role devices connected in a ring is not limited to this, and any number of devices can be connected as long as they can be identified by the above-mentioned Src ID and Dst ID.

FIG. 10 shows the DIN and DOUT connections when the master device 1, the slave devices 2-1 and 2-2, and the dual-role device 3 are connected in a ring. As shown in FIG. 10, the master device 1, the slave devices 2-1 and 2-2, and the dual-role device 3 input signals received from an adjacent device to the DIN terminal, and output signals transmitted to an adjacent device from the DOUT terminal Therefore, in FIG. 10, all packets including commands, responses, and user data, and all control signals including idle signal are always transmitted counter-clockwise.

FIG. 11A is a diagram showing a case in which commands and responses are transmitted and received between the master device 1 and the slave device 2-1. The slave device 2-2 and the dual-role device 3 at this point execute a bypass operation (discussed below). As shown in FIG. 11A, when the master device 1 sends a CMD packet P551, the dual-role device 3 sends the received P551 to the slave device 2-1. The slave device 2-1 identifies and processes the received P551, and sends a RES packet P552 to the slave device 2-2. The slave device 2-2 sends the master device 1 the received P552 to the master device 1. The processing indicated by the CMD includes, for example, initialization, resetting, register reading and writing, and the acquisition of status information. The information contained in the RES includes, for example, the result of the operation indicated by the CMD, the internal status of the slave device 2-1, and register values.

As described through reference to FIG. 9A (CMD packets P523 and P524), after receiving the CMD packet P551 sent by the master device 1, the slave device 2-1 may send the master device 1 the CMD packet. In this case, just the master device 1 may receive the CMD packet sent by the slave device 2-1, or a device located in between the slave device 2-1 and the master device 1 (in this case, the slave device 2-2) may receive and process the CMD packet.

FIG. 11B is a diagram showing a case in which the master device 1 writes data to the slave device 2-1. The slave device 2-2 and the dual-role device 3 at this point execute a bypass operation (discussed below). As shown in FIG. 11, when the master device 1 transmits to the dual-role device 3 a CMD packet P561 instructing the writing of data, the dual-role device 3 sends the slave device 2-1 the received P561. Upon receiving the P561, the slave device 2-1 sends the slave device 2-2 a RES packet P562. The slave device 2-2 sends the master device 1 the received P562. Upon receiving the P562, the master device 1 sends the dual-role device 3 a REQ packet P563. The dual-role device 3 sends the slave device 2-1 the received P563. After receiving the P563, the slave device 2-1 sends the slave device 2-2 a RDY packet P564 if the state allows the reception of write data. The slave device 2-2 sends the master device 1 the received P564. Upon receiving the P564, the master device 1 sends the dual-role device 3 a data burst P565. The dual-role device 3 sends the slave device 2-1 the received data burst P565. Upon receiving the P565, the slave device 2-1 determines whether or not the received data contains any error, and sends the slave device 2-2 a STAT packet P566. The slave device 2-2 sends the master device the received P566. Upon receiving the P566, the master device 1 determines whether data writing succeeded or failed. The transmission and reception of packets in P563 to P566 is then repeated until the master device 1 completes the desired data writing, after which the slave device 2-1 sends the slave device 2-2 an END packet P567. The master device 1 concludes data write processing upon receipt of the P567.

When the master device 1 reads data from the slave device 2-1, the operation of the master device 1 and the slave device 2-1 is the same as described for FIG. 9C except that a bypass operation is executed to transmit the packet received by the slave device 2-2 and the dual-role device 3 located between the master device 1 and the slave device 2-1.

The operation of the communication system pertaining to this embodiment was described by using as an example the transfer of various kinds of information between the master device 1 and the slave device 2-1, but the operation is the same when transferring various kinds of information between the master device 1 and the slave device 2-2 or the dual-role device 3.

As discussed above, with a communication system in which the master device 1 is connected in a ring to the slave devices 2-1 and 2-2 and the dual-role device 3, the transfer of various kinds of information between the master device 1 and the slave devices 2-1 and 2-2 and the dual-role device 3 can be executed by the same operation as with one-to-one connection.

1-2-5. Bypass Operation with Ring Connection

Figures 12A, 12B, 12C:
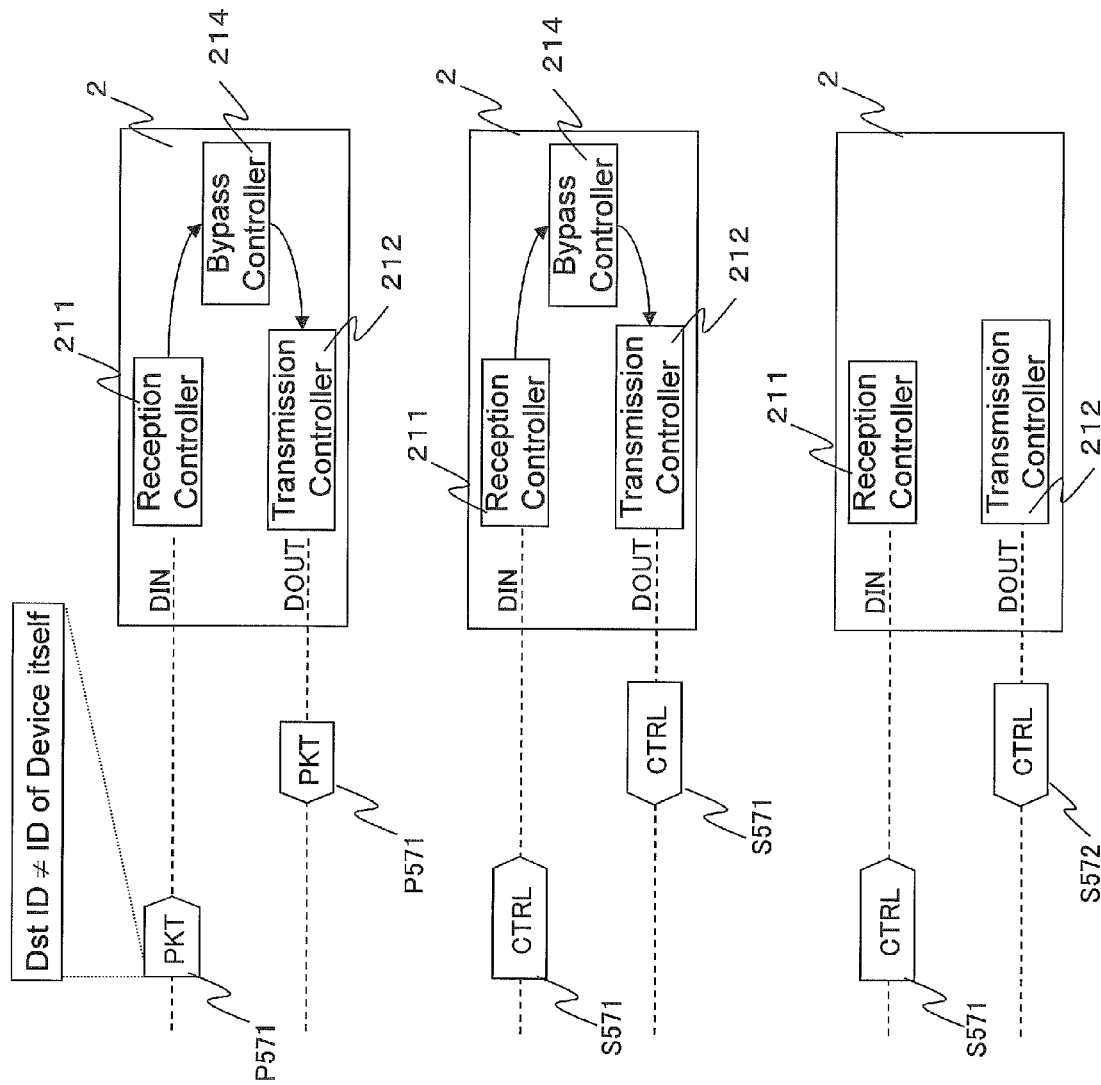
FIGS. 12A to 12C illustrate a bypass operation in a ring connection.

FIGS. 12A to 12C are diagrams illustrating the bypass operation of the master device 1, the slave device 2, and the dual-role device 3 in the communication system pertaining to this embodiment. FIGS. 12A to 12C illustrate the operation of the slave device 2, but the bypass operation is the same for the master device 1 and the dual-role device 3.

FIG. 12A shows the bypass operation executed when the destination information Dst ID included in the header of a reception packet P571 is different from the ID of the host device. In FIG. 12a, the reception controller 211 of the slave device 2 refers to destination information included in the header upon receipt of the packet P571. When the reception controller 211 recognizes that the packet is not addressed to itself on the basis of this destination information, the bypass controller 214 sends the P571 received by the reception controller 211 from the transmission controller 212. If the reception controller 211 determines that the packet is addressed to itself, it transmits this packet to the backend unit 22 for processing.

FIGS. 12B and 12C show the operation when a control signal S571 is bypassed. In FIG. 12B, when the reception controller 211 of the slave device 2 receives the control signal S571 and recognizes that the received signal is a control signal, the bypass controller 214 transmits the S571 received by the reception controller 211 from the transmission controller 212.

Meanwhile, in FIG. 12C, the slave device 2 recognizes an interval for transmitting the control signal over the bus, and receives the control signal S571 while transmitting a control signal S572 having the same meaning. This operation will be possible, for example, as long as it is specified in advance what kind of control signal will be transmitted in an interval where no command, response, user data, or other such packet is being transferred over the bus. In FIGS. 12B and 12C, the operations executed by the external terminals DIN and DOUT of the slave device 2 are the same, so either method can be employed. In addition to control signals, any signal other than a packet can also be bypassed by the method shown in either FIG. 12B or FIG. 12C, or a combination of the two.

Thus, the master device 1, the slave device 2, and the dual-role device 3 can operate such that packets, control signals, and so forth not addressed to these devices are bypassed, and in a communication system in which these devices are connected in a ring, the system can operate just as if the bypassed devices were part of a transmission path.

1-2-6. Interrupt Processing

Figure 13A:
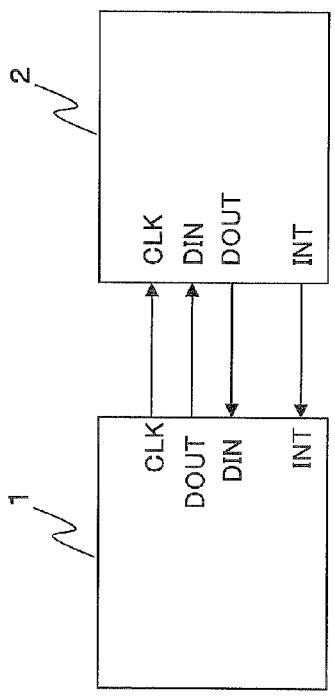
FIGS. 13A and 13B illustrate interrupt processing using a dedicated signal line.
Figure 13B:
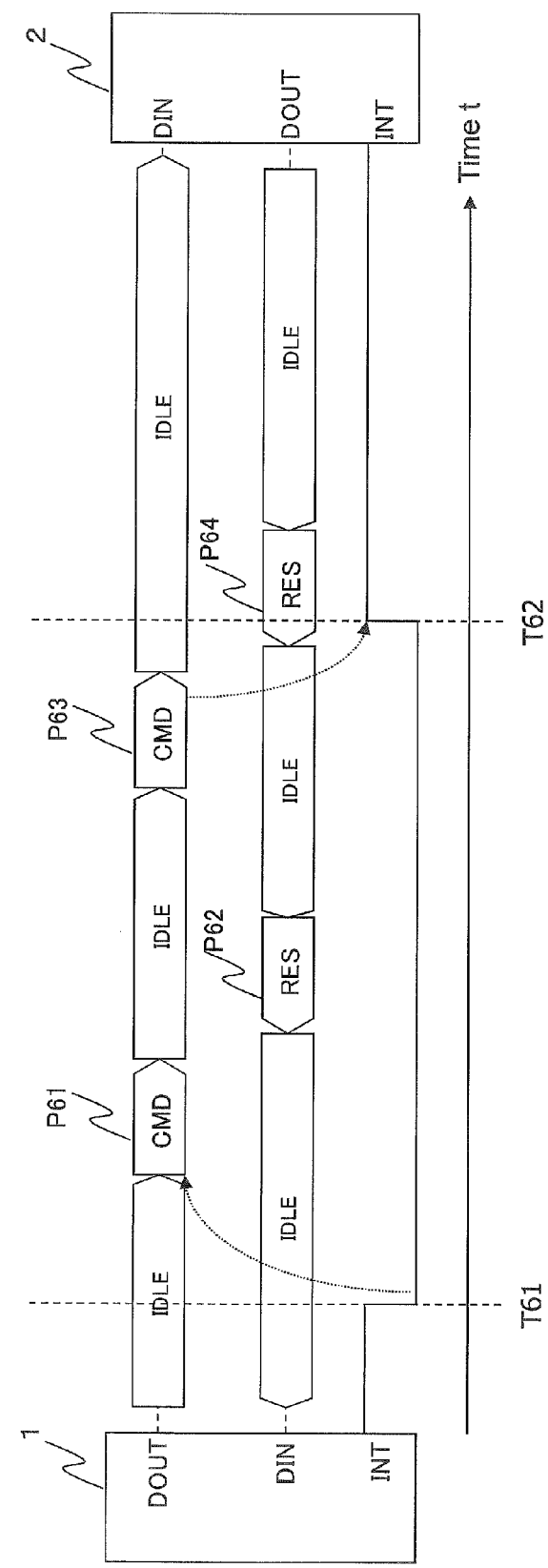

FIG. 13 shows a method in which, in the communication system pertaining to this embodiment, the slave device 2 and the dual-role device 3 notify the master device 1 of an interrupt by using a dedicated signal line INT (an example of a second communication line). FIG. 13A shows the connection between the master device 1 and the slave device 2, and FIG. 13B shows the transmission and reception of signals between the master device 1 and the slave device 2. FIG. 13 illustrates a case when the master device 1 and the slave device 2 are connected one-to-one, but the operation is the same when the master device 1, the plurality of slave devices 2-1 and 2-2, and the dual-role device 3 are connected in a ring, as shown in FIG. 10.

In FIG. 13B, when the slave device 2 requests processing of the master device 1 or detects some kind of error, the signal line INT is used to send an interrupt signal (INT signal) to the master device 1 (T61).

In FIG. 13B, the interrupt signal is assumed to be a low active signal (the interrupt notification with the signal line as "0"), but may instead be high active (the interrupt notification with the signal line as "1"). If the master device 1 recognizes notification of an interrupt by an interrupt signal, a CMD packet P61 for reading the interrupt factor, that is, the CMD packet P61 that asks for the interrupt factor, is transmitted to the slave device 2. Upon receiving the P61, the slave device 2 sends the master device 1 an interrupt factor with a RES packet P62. The master device 1 receives the P62 and recognizes the interrupt factor, and sends the slave device 2 a CMD packet P63 for clearing the interrupt. Upon receiving the P63, the slave device 2 sends the master device 1 a RES packet P64, and ends interrupt notification by interrupt signal (T62). The order of the transmission of the RES packet P64 and the end of the interrupt notification may be reversed.

Meanwhile, FIG. 14 shows a method in which, in the communication system pertaining to this embodiment, the slave device 2 and the dual-role device 3 send an interrupt to the master device 1 by using the data signal lines DIN and DOUT, without using the dedicated signal line INT. In FIG. 14A, if the slave device 2 requests processing of the master device 1 or detects some kind of error, an IRQ signal S9 is outputted via the signal line DOUT to given notification (T91). When the master device 1 recognizes the IRQ signal S9 on the bus, a CMD packet P91 that reads the interrupt factor, that is, a CMD packet P91 that asks for the interrupt factor, is sent to the slave device 2. Upon receiving the P91, the slave device 2 sends the master device 1 the interrupt factor with the RES packet P92, after which the output of the IRQ signal S9 is continued. The master device 1 receives the P92 and recognizes the interrupt factor, and sends the slave device 2 a CMD packet P93 for clearing the interrupt. Upon receiving the P93, the slave device 2 transmits the RES packet P94, stops the output of the IRQ signal S9, and outputs an idle signal to the bus to end the interrupt notification (T92). The timing at which the output of the IRQ signal S9 is stopped may be during reception of the CMD packet P93, or after the transmission of the RES packet P94.

As shown in FIG. 14B, the IRQ signal S9 may be configured to maintain a single state (such as "1" or "0"; a value whose polarity is reversed from that of the idle signal can be used), or as shown in FIG. 14B, a single symbol (such as a symbol with 8b/10b encoding on a differential transmission path) is sent repeatedly. Alternatively, as shown in FIG. 14D, the IRQ signal S9 can be configured so that a plurality of symbols are sent repeatedly (such as periodically or randomly sending two symbols, IRQ0 and IRQ1). Furthermore, with a configuration in which a symbol is sent repeatedly as shown in FIGS. 14C and 14D, a combination of symbols (SYNC and IRQ0) or (SYNC and IRQ1) may be sent repeatedly as shown in FIG. 14E. With the configuration in FIG. 14E, even when no packets are being transmitted or received on the bus, reliable communication will be possible by sending a symbol SYNC for maintaining synchronization between the received data DIN and the clock CLK between the master device 1 and the slave device 2 and the dual-role device 3.

FIGS. 14A to 14E illustrate a case in which the master device 1 and the slave device 2 are connected one-to-one, but the operation is the same when the master device 1, the plurality of slave devices 2-1 and 2-2, and the dual-role device 3 are connected in a ring.

At this point, a device located between the master device 1 and the slave device 2 sending an interrupt executes the bypass operation illustrated in FIGS. 12A to 12C, so the IRQ signal is reliably send to the master device 1.

An example of sending the interrupt by using the dedicated signal line INT is described below, but with the communication system pertaining to this embodiment, the sending of the interrupt from the slave devices 2, 2-1, and 2-2 and the dual-role device 3 to the master device 1 may be accomplished by using an IRQ signal that transmits on the data signal line DOUT, rather than using the dedicated signal line INT. Furthermore, the slave devices 2, 2-1, and 2-2 and the dual-role device 3 may comprise both interrupt notification methods.

1-3. Operation in Transfer Between Devices

The operation in transfer between devices in the communication system pertaining to this embodiment configured as above will now be described.

With the communication system pertaining to this embodiment, the dual-role device 3 acquires a bus control under instruction from the master device 1, and issues a command to the slave device 2 and transfers data. When the transfer is complete, the bus control is returned to the master device 1. This series of operations is called transfer between devices. This transfer between devices will be described through reference to the drawings.

1-3-1. Bus Control Acquisition

Figure 15:
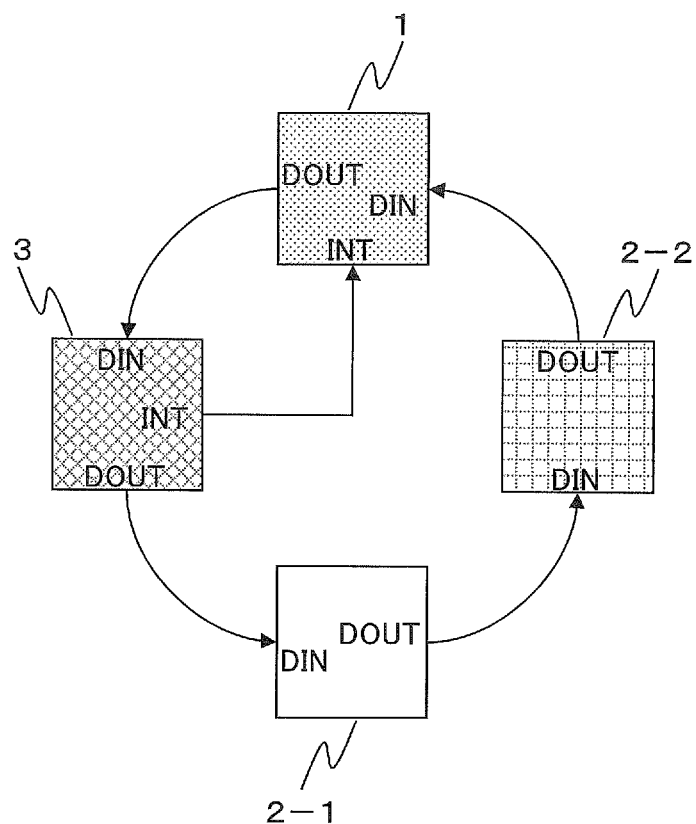
FIG. 15 is a simplified diagram of the connection state of the communication system pertaining to Embodiment 1.

FIG. 15 is a simplified diagram of the ring connection of the communication system pertaining to this embodiment. In the example shown in FIG. 15, the master device 1, the dual-role device 3, the slave device 2-1, and the slave device 2-2 are connected in a ring in that order, and the INT output terminal of the dual-role device 3 is connected to the INT input terminal of the master device 1. In the example shown in FIG. 15, during normal operation, as discussed above, the master device 1 has the bus control, and transfers commands, responses, and user data between the slave devices 2-1 and 2-2 and the dual-role device 3.

Figure 16:
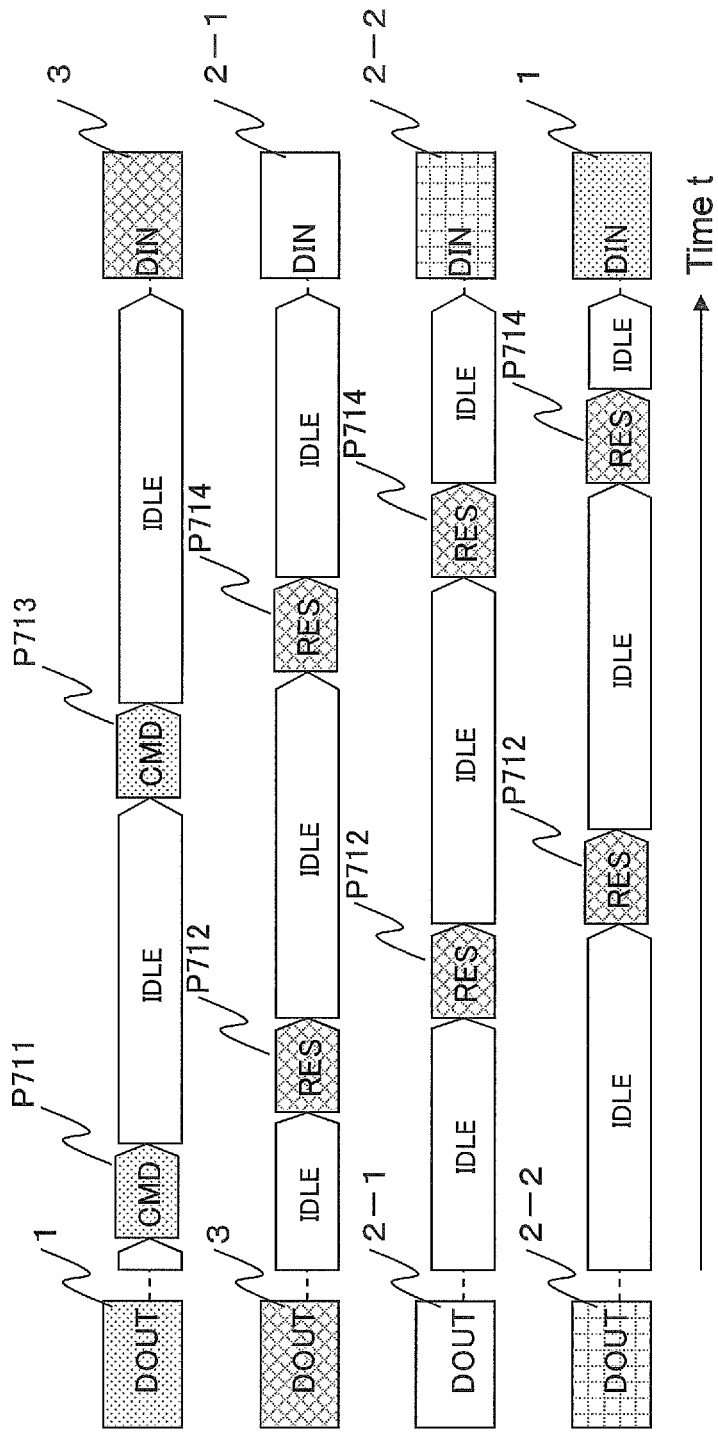
FIG. 16 illustrates bus control acquisition processing executed by the dual-role device in this communication system.

FIG. 16 shows the processing by which the dual-role device 3 acquires the bus control under instruction from the master device 1 in the communication system pertaining to this embodiment. In FIG. 16, the master device 1 acquires the bus control for the dual-role device 3, and transmits a CMD packet P711 instructing data transfer with the other slave device 2-1 or 2-2. The slave device with which the dual-role device 3 executes data transfer, and the parameters for transferring data, such as address and data length, may be set ahead of time by the master device 1 for the dual-role device 3 using a separate data packet or CMD packet, or they may be set with a payload of the CMD packet P711. Also, the number of times for transferring data is not limited to once, and it is also possible to set a plurality of transfers all at once in a list format, for example. Upon receiving the P711, the dual-role device 3 acquires the bus control by transmitting a RES packet P712 through the slave devices 2-1 and 2-2 to the master device 1.

The master device 1 may confirm whether or not the dual-role device 3 has successfully acquired the bus control by issuing a CMD packet P713 for reading the status of the dual-role device 3. Upon receiving the P713, the dual-role device 3 transmits a RES packet P714 including status information indicating the bus control acquisition status, through the slave devices 2-1 and 2-2 to the master device 1. The dual-role device 3 may be configured to issue a command to the slave device 2-1 or 2-2 only when having received the status reading CMD packet P713 from the master device 1. In this way, the dual-role device 3 can acquire the bus control under instruction from the master device 1, and execute data transfer by issuing a CMD packet to the other slave device 2-1 or 2-2.

Also, until the bus control is returned from the dual-role device 3, the master device 1 is not allowed to issue any CMD packets to the slave devices 2-1, 2-2, and the dual-role device 3, and the above-mentioned bypass operation is executed for control signals and packets other than packets addressed to the master device 1.

The slave devices 2-1 and 2-2 recognizes that the received packets P712 and P714 are not addressed to themselves, and then execute the bypass operation. They also execute the bypass operation for control signals other than the packets, such as an idle signal.

1-3-2. Data Transfer Between Dual-Role Device and Slave Device

Figure 17:
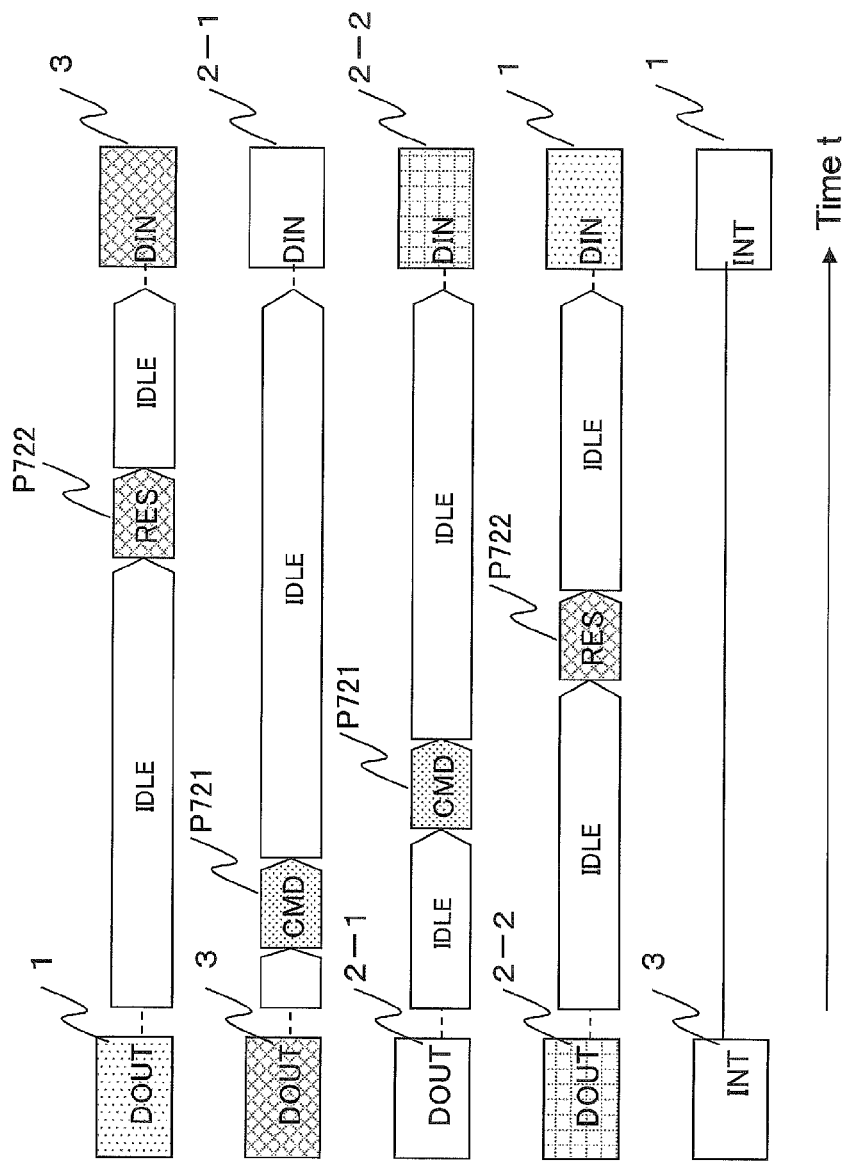
FIG. 17 illustrates data processing when the dual-role device in this communication system has the bus control.
Figure 18:
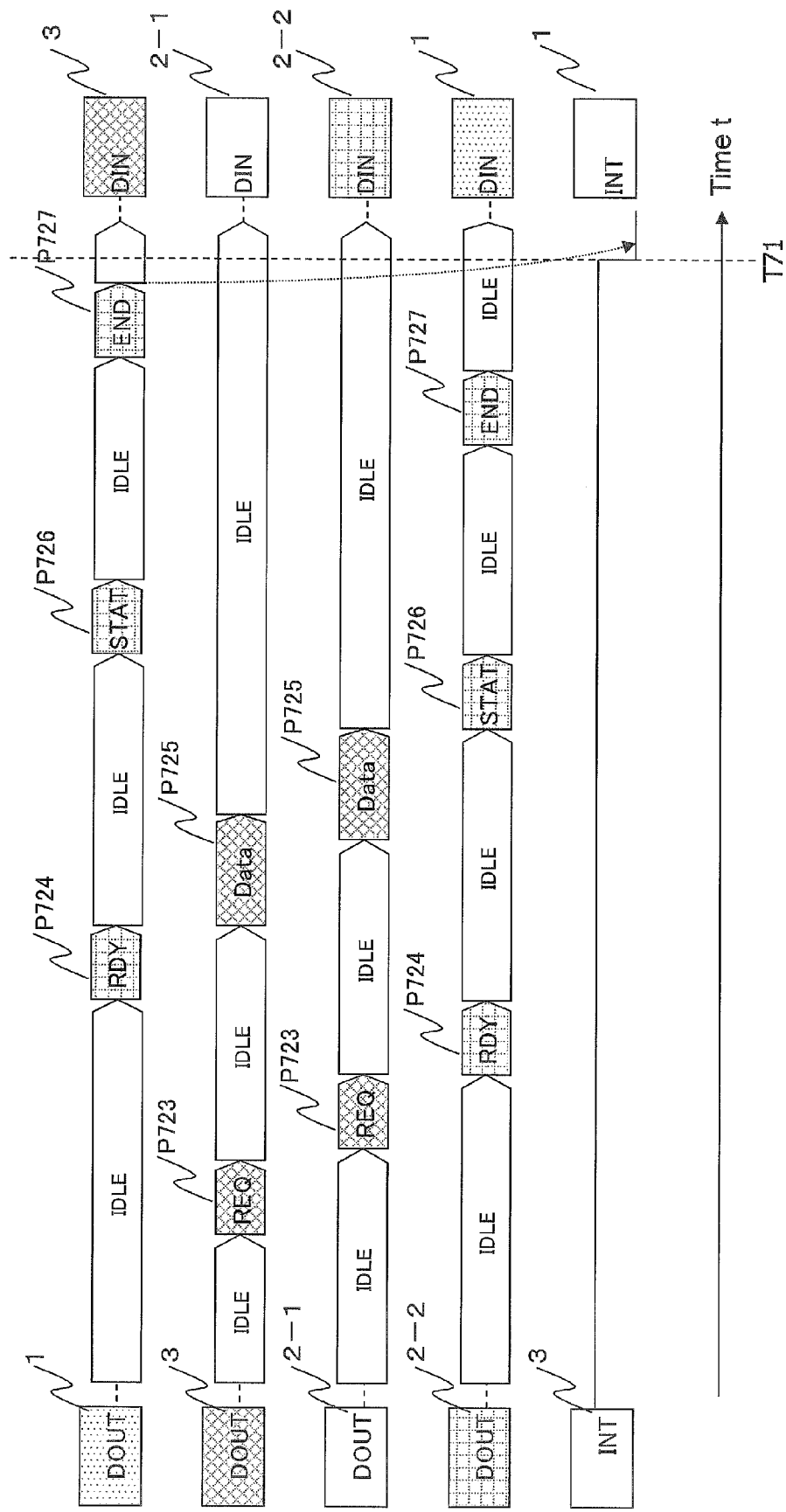
FIG. 18 illustrates data transfer processing when the dual-role device in this communication system has the bus control.

FIGS. 17 and 18 show the processing to write data by issuing a CMD packet to the slave device 2-2 when the dual-role device 3 has the bus control in the communication system pertaining to this embodiment. In FIG. 17, the dual-role device 3 issues a CMD packet P721 instructing the writing of data to the slave device 2-2. The slave device 2-1 sends the received P721 to the slave device 2-2 by a bypass operation. Upon receiving the P721, the slave device 2-2 sends the master device 1 a RES packet P722. The master device 1 sends the dual-role device 3 the received P722 by a bypass operation, and the dual-role device 3 receives the RES packet P722. In this way, the dual-role device 3 can send CMD packets to the slave device 2-2, and receive RES packets from the slave device 2-2.

In FIG. 18, upon receiving the RES packet P722 as discussed above, the dual-role device 3 sends the slave device 2-1 a REQ packet P723. The slave device 2-1 sends the slave device 2-2 the received P723 by a bypass operation. After receiving the P723, the slave device 2-2 sends the master device 1 a RDY packet P724 if the state of the slave device 2-2 allows the receipt of write data. The master device 1 sends the dual-role device 3 the received P724 by a bypass operation. Upon receiving the P724, the dual-role device 3 sends a data burst P725 to the slave device 2-1. The slave device 2-1 sends the received data burst P725 to the slave device 2-2 by a bypass operation. Upon receiving the P725, the slave device 2-2 determines whether or not the received data contains any errors, and sends a STAT packet P726 to the master device 1. The master device 1 sends the received P726 to the dual-role device 3 by a bypass operation. Upon receiving the P726, the dual-role device 3 determines whether the writing of data has succeeded or failed. The transmission and reception of packets P723 to P726 are then repeated until the desired data writing is complete. After that, the slave device 2-2 sends the master device 1 an END packet P727. The master device 1 then sends the received P727 to the dual-role device 3 by a bypass operation. The dual-role device 3 concludes data write processing upon receipt of the P727.

In this way, the dual-role device 3 can write data to the slave device 2-2 in place of the master device 1, allowing faster data transfer. Also, since the master device 1 can execute other processing while transfer between devices is being executed, the overall performance of the communication system can be enhanced.

When the dual-role device 3 reads data from the slave device 2-2, the operation of the dual-role device 3 and the slave device 2-2 is the same as that described above for FIG. 9C.

1-3-3. Bus control Return

In the example shown in FIG. 18, the dual-role device 3 executes data write processing with the slave device 2-2 under instruction from the master device 1. When this processing is complete, the interrupt signal (INT signal) is set to "0," and an interrupt notification is sent to the master device 1 at T71 shown in FIG. 18. By the interrupt notification, the dual-role device 3 returns the bus control to the master device 1. The "return of the bus control" means that the bus control is deactivated at the dual-role device 3, that is, the function of transmitting and receiving various kinds of information with the other slave device 2 is stopped.

Thereafter, the master device 1 and the dual-role device 3 repeat the processing in FIGS. 16 to 18 until all of the instructed transfers between devices is complete.

The return of the bus control from the dual-role device 3 to the master device 1 resulting from interrupt notification may be executed after the dual-role device 3 completes all the processing for transfer between devices instructed by the master device 1. In this case, the master device 1 need only send one bus control acquisition instruction to the dual-role device 3.

1-3-4. Instruction to Stop Transfer Between Devices

Figure 19:
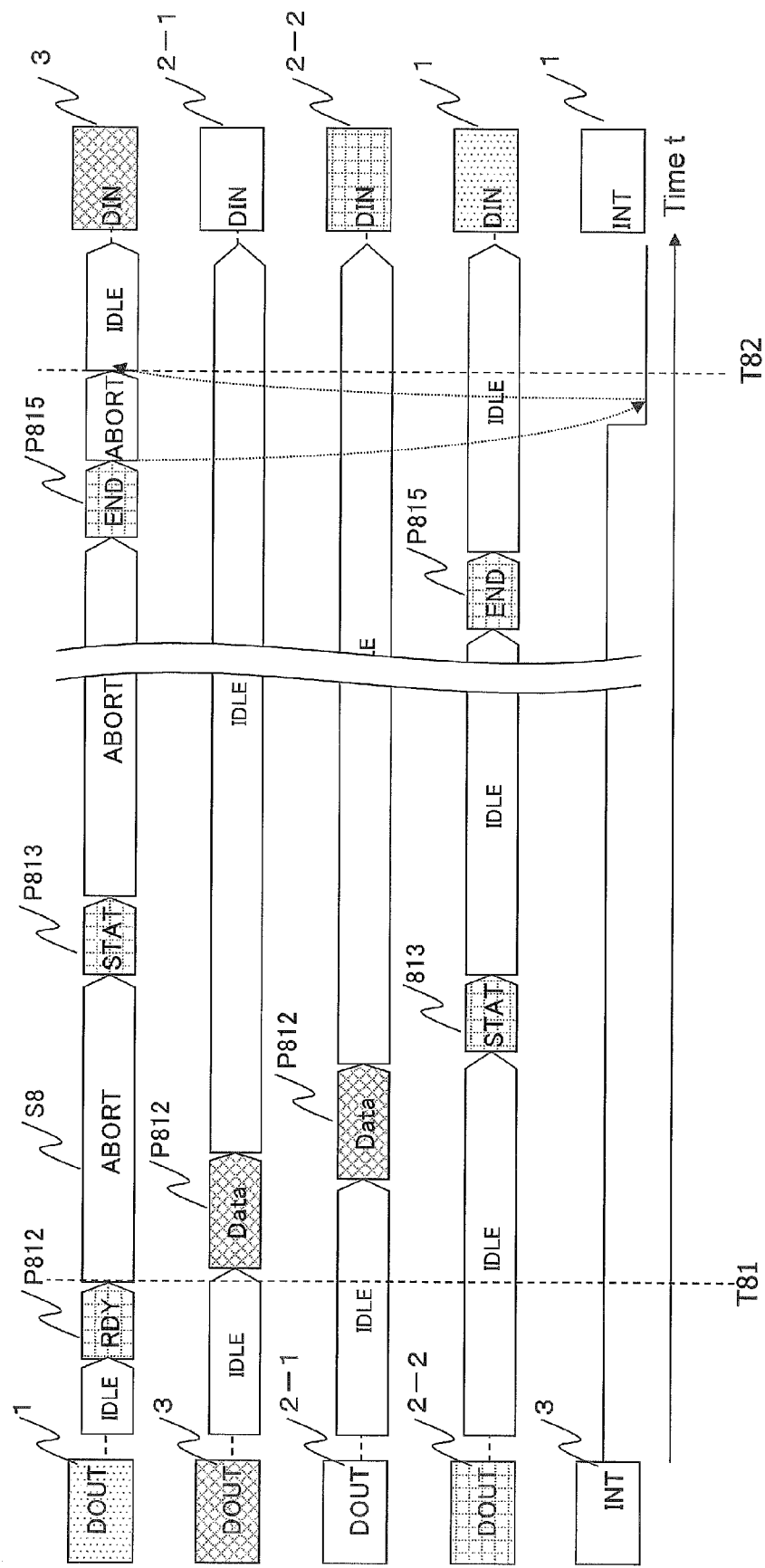
FIG. 19 illustrates data processing when there is a bus control return request from the master device in this communication system.
Figure 20:
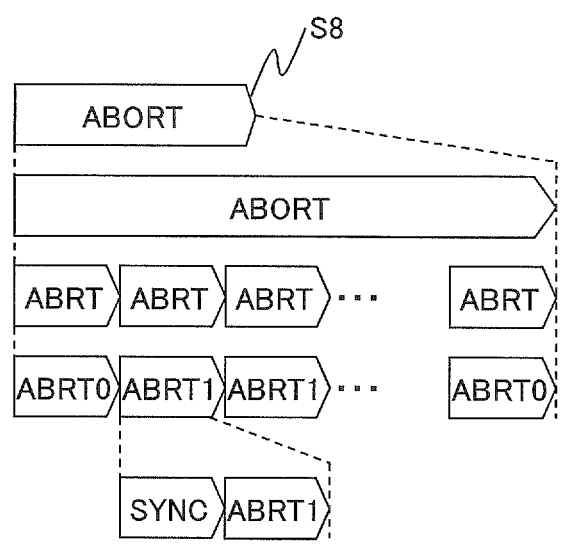
FIGS. 20A to 20D are a diagram of the configuration of an abort signal.
Figure 21:
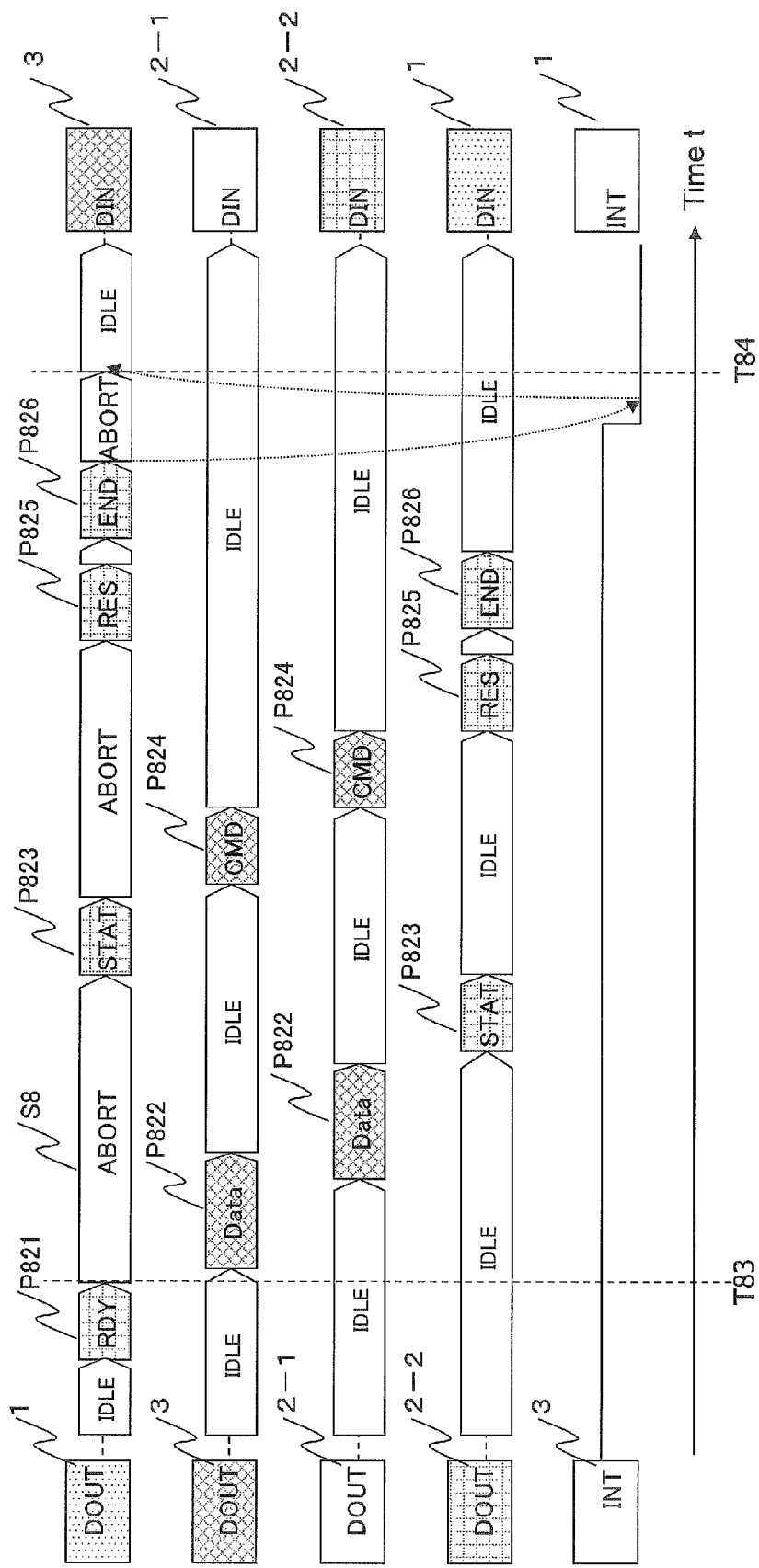
FIG. 21 illustrates data processing when there is a bus control return request from the master device in this communication system.

FIGS. 19 to 21 show processing in which the master device 1 instructs the dual-role device 3 to stop transfer and return the bus control while the dual-role device 3 is transferring data with the slave device 2-2 after having acquired the bus control in the communication system pertaining to this embodiment.

In the example shown in FIG. 19, when the dual-role device 3 is writing data to the slave device 2-2 (during which the master device 1 and the slave device 2-1 transfer data by a bypass operation), the master device 1 transmits an abort signal S8 (an example of a halt signal) instructing a stop of transfer and a return of the bus control at T81 shown in FIG. 19. The abort signal is transmitted by utilizing the period in which no data is being transmitted or received (that is, during the idle signal period). Upon detecting the abort signal S8, the dual-role device 3 receives an END packet P815 from the slave device 2-2, and completes the running data write processing. After that, using the signal line INT, the dual-role device 3 sends an interrupt to the master device 1 and return the bus control. In this case, any of the transfers between devices preset by the master device 1 that have not yet been executed are not executed. Upon detecting an interrupt, the master device 1 determines that the bus control has been returned, stops the output of the abort signal S8, and outputs an idle signal to the bus at T82 shown in the drawing.

The abort signal S8 is made up of symbols or the like composed of a unique bit pattern. For example, as shown in FIG. 20A the abort signal S8 maintains a single state ("0" or "1"), or as shown in FIG. 20B, the abort signal S8 repeatedly sends a single symbol (such as a symbol with 8$b$/10$b$ encoding on a differential transmission path). Alternatively, as shown in FIG. 20C, the abort signal S8 can be configured so that a plurality of symbols are sent repeatedly (such as periodically or randomly sending two symbols, ABRT0 and ABRT1). Furthermore, when the abort signal S8 is configured to repeatedly send a symbol as shown in FIGS. 20B and 20C, it may be configured to repeatedly send a set of symbols (SYNC and ABRT0, or SYNC and ABRT1) as shown in FIG. 20E. With the configuration in FIG. 20E, even if no packets are being transmitted or received on the bus, reliable communication can be achieved by sending a symbol SYNC for maintaining synchronization with the DIN signal (reception signal) and the CLK signal between the master device 1 and the slave devices 2-1 and 2-2 and the dual-role device 3.

As shown in FIG. 21, the dual-role device 3 may also halt data transfer if the abort signal S8 is detected. In the example shown in FIG. 21, when the dual-role device 3 is writing data to the slave device 2-2 (during which the master device 1 and the slave device 2-1 transfer data by a bypass operation), the master device 1 sends the dual-role device 3 the abort signal S8 instructing the stop of transfer and the return of the bus control at T83 as shown in FIG. 21. When having detected the abort signal S8 from the master device 1, the dual-role device 3 ends single-unit of processing data transfer by receiving a STAT packet P823 from the slave device 2-2 via a bypass operation. The dual-role device 3 then sends a CMD packet P824 to the slave device 2-2 via a bypass operation by the slave device 2-1, and instructs a stop of transfer. The dual-role device 3 then receives a RES packet P825 and an END packet P826 notifying of the completion of halting transfer, from the slave device 2-2 via a bypass operation by the master device 1. The dual-role device 3 then sends an interrupt signal to the master device 1 on the signal line INT, and returns the bus control to the master device 1. In this case, any remaining execution of transfer between devices that was preset by the master device 1 but has not yet been executed is not executed. Upon detection of an interrupt, the master device 1 determines that the bus control has been returned, stops the output of the abort signal S8, and outputs an idle signal to the bus at T84 shown in FIG. 21.

Thus, even if transfer between devices is being executed by the dual-role device 3 with the slave devices 2-1 and 2-2, the master device 1 can use the abort signal S8 in the period in which no packets are being transmitted on the bus to request a transfer stop of the dual-role device 3, and take back the bus control. This allows a communication system with good responsiveness to be obtained when processing of high priority occurs in the master device 1. Also, since the master device 1 continues to transmit the abort signal S8 until an interrupt is sent from the dual-role device 3, the dual-role device 3 can reliably detect the abort signal S8, stop transfer, and return the bus control.

1-4. Effect, etc.

As discussed above, in this embodiment, the dual-role device 3 comprises a DIN terminal that is connected to a data signal line and receives data from the master device 1, and a DOUT terminal that is connected to the data signal line and transmits data to another slave device 2-1. The dual-role device 3 receives data and responses via the DIN terminal, and transmits data and commands via the DOUT terminal, from and to the other slave device 2-1 or 2-2 according to the bus control given by the master device 1. Upon receiving an abort signal from the master device 1, the dual-role device 3 sends an interrupt signal to the master device 1 in a state in which no data is being received or transmitted. After sending the interrupt signal to the master device 1, the dual-role device 3 stops the function of controlling the transmission and reception of data according to the bus control. Meanwhile, the master device 1 comprises a DOUT terminal that is connected to the data signal line and transmits data to a slave device, and a DIN terminal that is connected to the data signal line and receives data from a slave device. The master device 1 gives the bus control to the dual-role device 3 (which is a slave device), and stops the function of controlling transmission and reception of the data of the master device 1. The master device 1 sends the dual-role device 3 an abort signal while the dual-role device 3 is transmitting or receiving data according to the given bus control. After sending the abort signal and receiving an interrupt signal from the dual-role device 3, the master device 1 enables execution of controlling the transmission and reception of data according to the bus control.

Therefore, even if the dual-role device 3 having the bus control is transferring data with another slave device 2-1, the master device 1 can request and acquire the return of the bus control. This results in a communication system that is very responsive.

In this embodiment, the master device 1 repeatedly sends an abort signal to the dual-role device 3 in a period in which data is not being transmitted until the transmission and reception of data is ended. Therefore, the return of the bus control can be requested by the master device 1 to the dual-role device 3 without disturbing the transmission and reception of data.

In this embodiment, after having received an abort signal from the master device 1, the dual-role device 3 sends an interrupt signal to the master device 1 after the transmission and reception of data is completed, or after the transmission and reception of data is halted. Therefore, transfer of the bus control can be executed without affecting the transmission and reception of data.

In this embodiment, the dual-role device 3 comprises an INT output terminal that outputs interrupt signals, the master device 1 comprises an INT input terminal that inputs interrupt signals, and the interrupt signals are transmitted via a dedicated line that is different from the data communication line. Therefore, the bus control can be transferred more reliably between the dual-role device 3 and the master device 1.

In this embodiment, the master device 1, the slave device 2, and the dual-role device 3 can execute a bypass operation, so any packets, control signals, or the like not addressed to one of these devices will be bypassed, and therefore, in a communication system in which these devices are connected in a ring, the system can operate just as if each device were part of a transmission path, which affords faster communication.

Furthermore, in this embodiment, the DOUT terminal of the master device 1 is connected to the DIN terminal of the dual-role device 3, and there is no other slave device between the master device 1 and the dual-role device 3, so the abort signal S8 transmitted by the master device 1 can be reliably received by the dual-role device 3.

In FIGS. 19 to 21, a case was described in which the dual-role device 3 wrote data to the slave device 2-2, but the operation is the same when data is read. Specifically, the master device 1 can use the abort signal S8 during the period in which no packets are being transmitted on the bus to request the stop of transfer to the dual-role device 3, and take back the bus control.

Furthermore, in FIG. 19 or 21, the dual-role device 3 may send the master device 1 information about how far the preset processing for transfer between devices has been executed, or about how much has yet to be executed, with a response (RES) to a command (CMD) from the master device 1.

Second Embodiment

Figure 22:
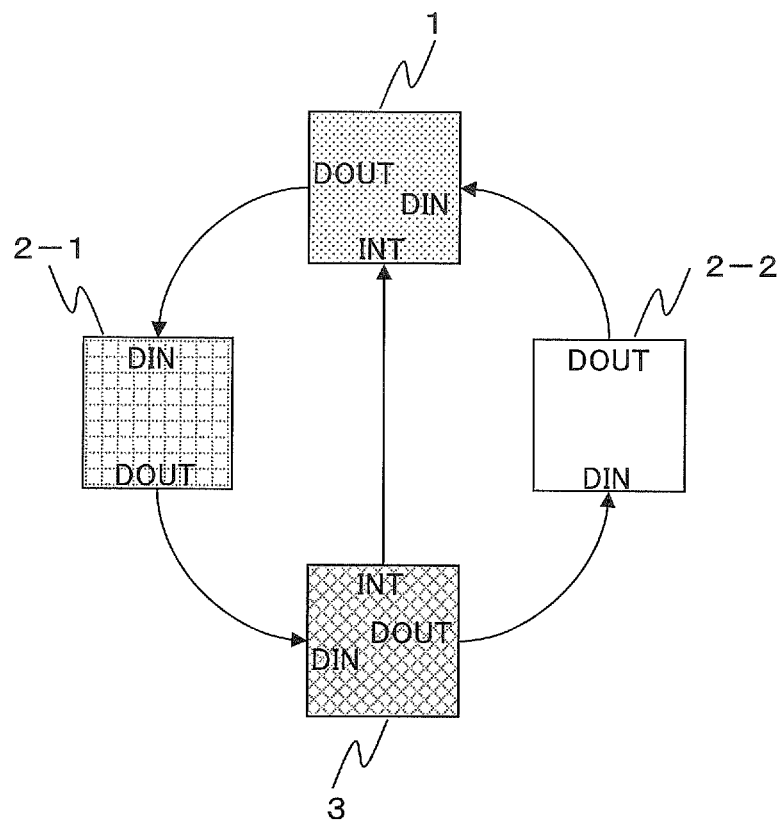
FIG. 22 is a simplified diagram of the connection of the communication system pertaining to Embodiment 2.

Embodiment 2 will now be described. FIG. 22 is a simplified diagram of the configuration of the communication system pertaining to this embodiment.

As shown in FIG. 22, with the communication system in this embodiment, the master device 1, the slave devices 2-1 and 2-2, and the dual-role device 3 have the same configuration as in Embodiment 1. However, what is different is that the master device 1, the slave device 2-1, the dual-role device 3, and the slave device 2-2 are connected in that order.

2-1. Operation of Communication System 2-1-1. Transfer Between Devices

Figure 23:
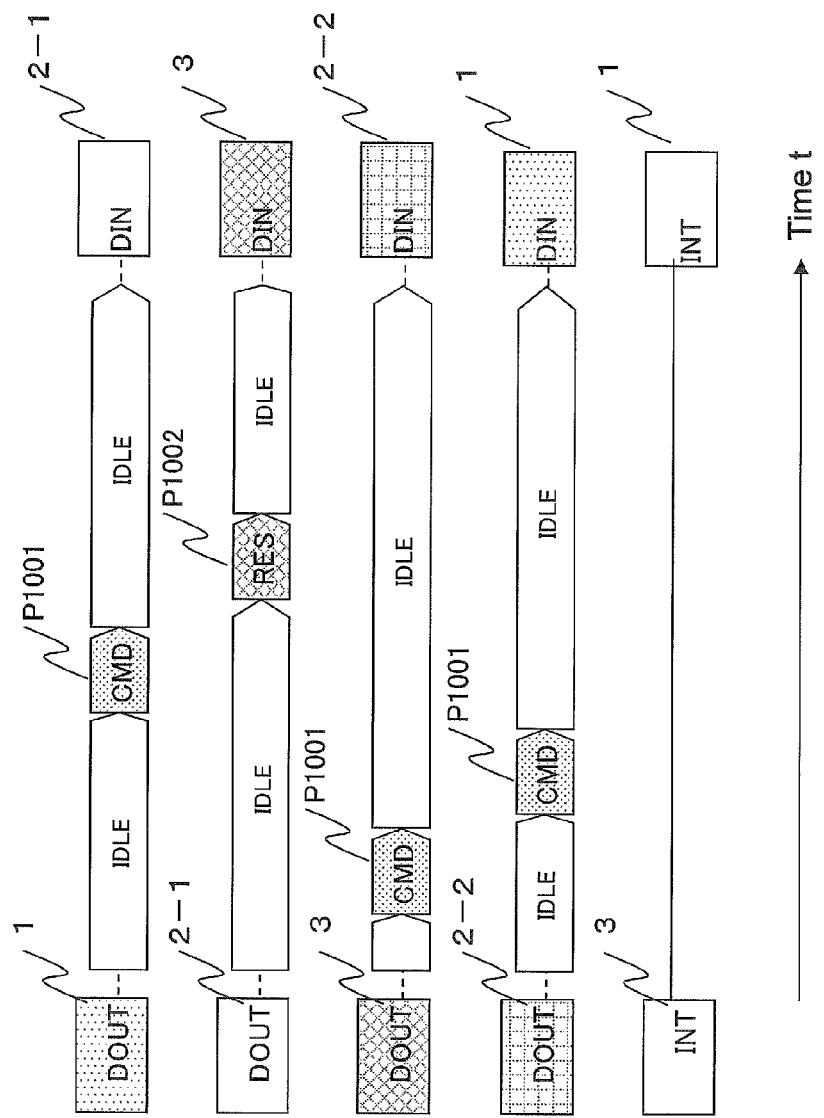
FIG. 23 illustrates data transfer processing in this communication system.
Figure 24:
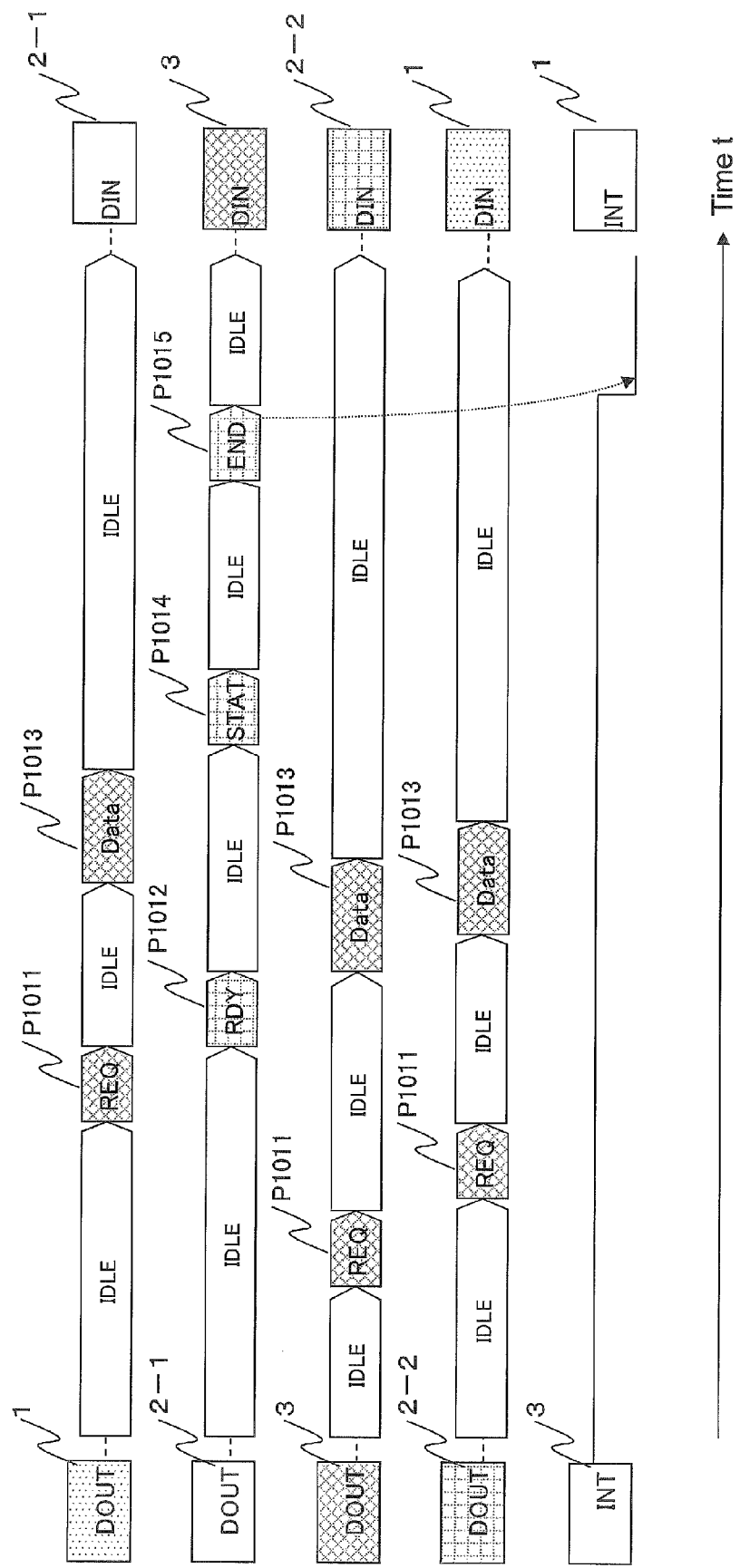
FIG. 24 illustrates data transfer processing in this communication system.

FIGS. 23 and 24 show the operation in transfer between devices in the communication system pertaining to this embodiment. With the communication system pertaining to this embodiment, the instruction to acquire the bus control from the master device 1 to the dual-role device 3 is carried out in the same way as in the first embodiment.

In FIG. 23, the dual-role device 3 having the bus control sends the slave device 2-2 a CMD packet P1001 instructing the writing of data to the slave device 2-1. The slave device 2-2 sends the received CMD packet P1001 to the master device 1 by a bypass operation, and the master device 1 sends the received P1001 to the slave device 2-1 by a bypass operation. Upon receiving the P1001, the slave device 2-1 sends a RES packet P1002 to the dual-role device 3. Thus, the dual-role device 3 can send the CMD packet to the slave device 2-1, and receive the RES packet P1002 from the slave device 2-1.

In FIG. 24, as discussed above, upon receiving the RES packet P1002, the dual-role device 3 sends a REQ packet P1011 to the slave device 2-2. The slave device 2-2 sends the received REQ packet P1011 to the master device 1 by a bypass operation, and the master device 1 sends the received P1011 to the slave device 2-1 by a bypass operation. After the receipt of the P1011, the slave device 2-1 sends a RDY packet P1012 if the state allows write data to be received. Upon receiving the P1012, the dual-role device 3 sends a data burst P1013 to the slave device 2-2. The slave device 2-2 sends the received data burst P1013 to the master device 1 by a bypass operation, and the master device 1 sends the received data burst P1013 to the slave device 2-1 by a bypass operation. Upon receiving the P1013, the slave device 2-1 determines whether or not the received data contains any errors, and sends a STAT packet P1014 to the dual-role device 3. Upon receiving the P1014, the dual-role device 3 determines whether the writing of data has succeeded or failed. The transmission and reception of packets P1011 to P1014 is then repeated until the dual-role device 3 completes the desired data writing. After that, the slave device 2-1 sends an END packet P1015. Upon receiving the P1015, the dual-role device 3 concludes the data write processing.

In this way, the dual-role device 3 can write data to the slave device 2-1, so the master device 1 can execute other processing while transfer between devices is being executed. As a result, the overall performance of the communication system can be enhanced.

When the dual-role device 3 reads data from the slave device 2-1, the operation of the dual-role device 3 and the slave device 2-1 is the same as that described above for FIG. 9C.

2-1-2. Instruction to Stop Transfer Between Devices

Figure 25:
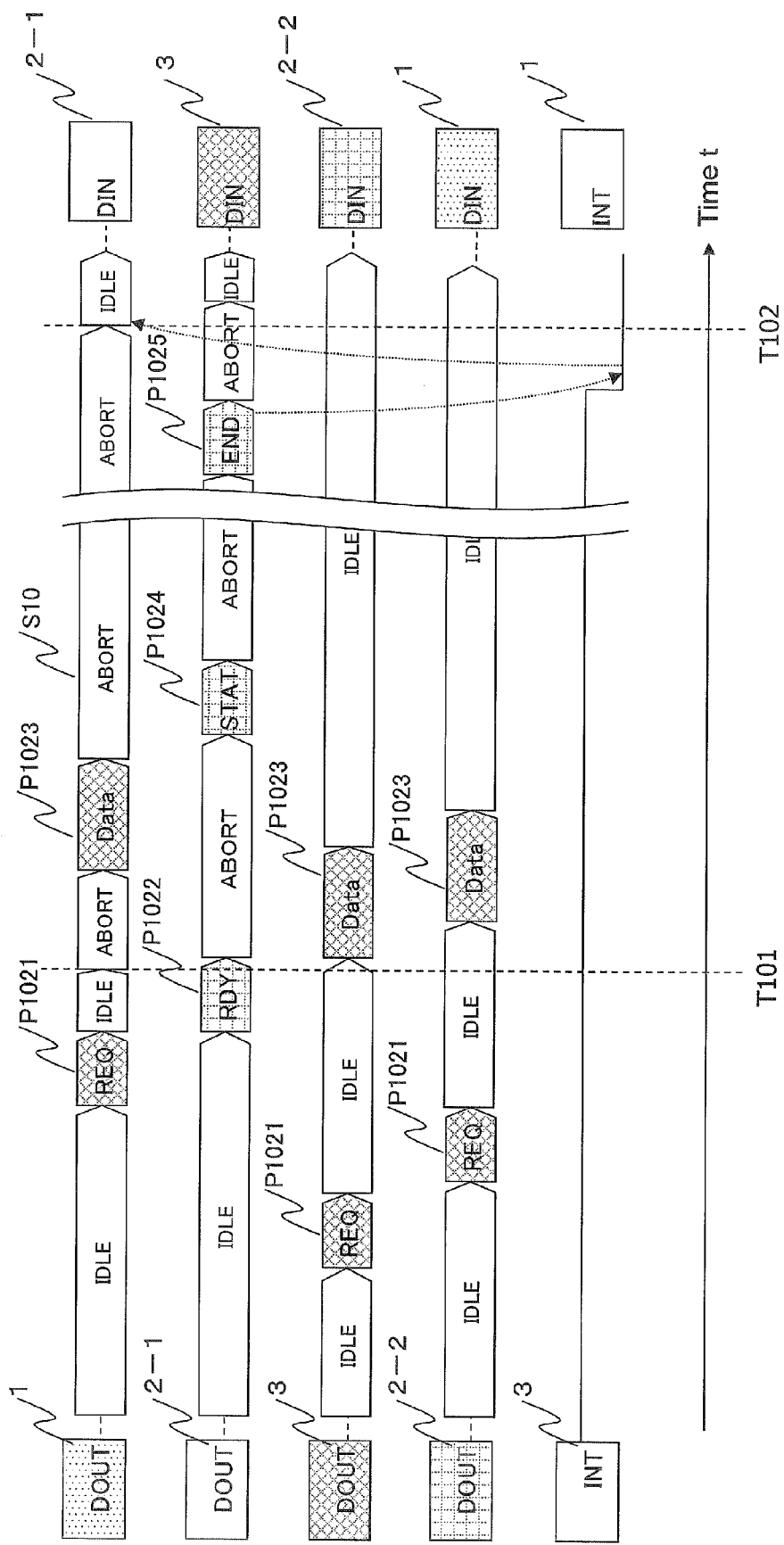
FIG. 25 illustrates data transfer processing in this communication system.

FIG. 25 shows the processing in which the master device 1 instructs the dual-role device 3 to stop transfer and return the bus control in the midst of data transfer between the slave device 2-1 and the dual-role device 3 having acquired the bus control, in the communication system pertaining to this embodiment.

In FIG. 25, while the dual-role device 3 is writing data to the slave device 2-1, the master device 1 sends an abort signal S10 instructing the stop of transfer and the return of the bus control at T101 shown in FIG. 25. The slave device 2-1 sends the received abort signal S10 to the dual-role device 3 by a bypass operation. Upon detection of the abort signal S10, the dual-role device 3 receives an END packet P1025 from the slave device 2-1 and then sends an interrupt to the master device 1 to return the bus control using the signal line INT. In this case, any processing for transfer between devices that was preset by the master device 1 and has not yet been executed is not executed. Just as in Embodiment 1, upon detection of the abort signal S10, the dual-role device 3 may send the interrupt after concluding any transfer that is being executed, or may send the interrupt after halting transfer by sending the slave device 2-1 a command to stop transfer that is in progress. Upon detection of an interrupt, the master device 1 determines that the bus control has been returned, stops the output of the abort signal S10, and outputs an idle signal to the bus at T102 shown in FIG. 25. The abort signal S10 is configured the same as in Embodiment 1.

2-2. Effect, etc.

As discussed above, in this embodiment, even if transfer between devices is being executed between the dual-role device 3 and the slave devices 2-1 or 2-2, the master device 1 can make use of the period in which no packets are being transmitted on the bus to send the abort signal S10 requesting a transfer stop of the dual-role device 3, and take back the bus control. Therefore, just as in Embodiment 1, a very responsive communication system can be obtained when processing of high priority occurs in the master device 1.

Also, just as in Embodiment 1, the master device 1 continues to send the abort signal S10 until an interrupt is received from the dual-role device 3, and the slave device 2-1 executes a bypass operation to send the received abort signal S10, so the dual-role device 3 reliably can detect the abort signal S10, stop transfer, and return the bus control.

In the example shown in FIGS. 22 to 25, a case was described in which the dual-role device 3 wrote data to the slave device 2-1, but the operation is the same when data is read. Specifically, the master device 1 can use the abort signal S10 during the period in which no packets are being transmitted on the bus to send a request for the stop of transfer to the dual-role device 3, and take back the bus control.

In FIG. 25, the dual-role device 3 may send the master device 1 information about how far the preset processing for transfer between devices has been executed, or about how much has yet to be executed, with a response (RES) to a command (CMD) from the master device 1.

Other Embodiments

Embodiments 1 and 2 were described above as examples of the technology disclosed in this application through reference to the drawings, but the specific configuration of the present invention is not limited to or by these embodiments, and various modifications and changes are possible without departing from the gist of the invention.

For example, the number of slave devices 2 and dual-role devices 3 can be any number greater than or equal to one.

Figure 26:
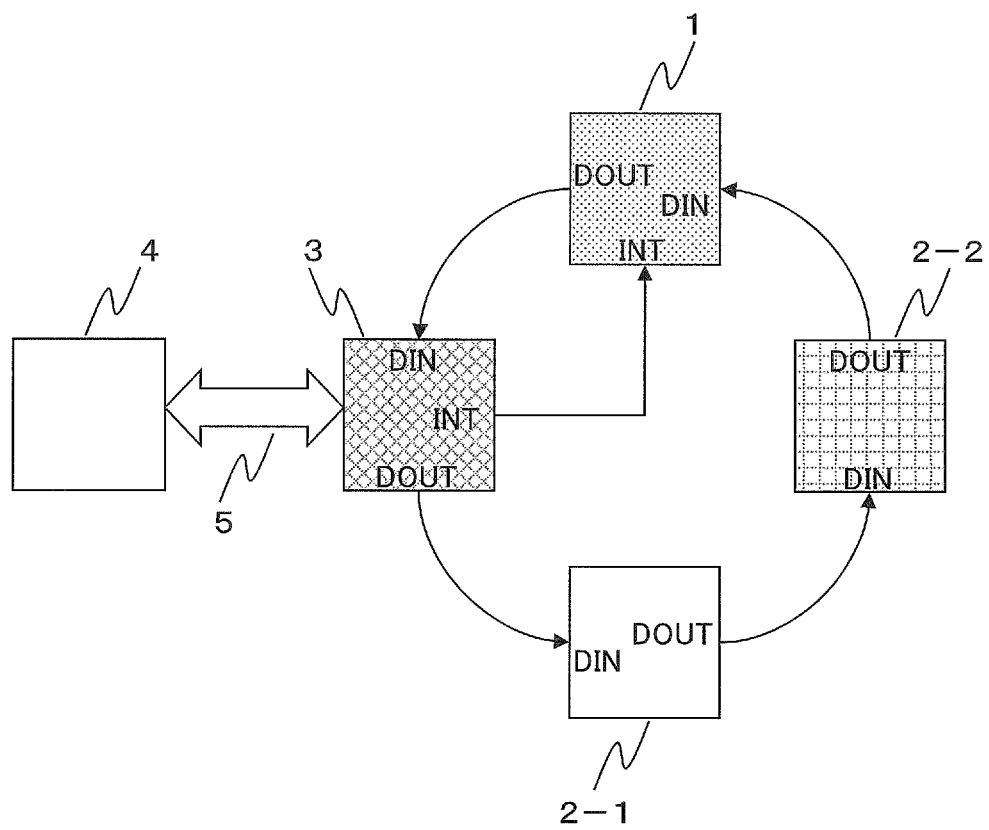
FIG. 26 illustrates the connection state when the master device is outside of the ring connection in the communication system pertaining to another embodiment.
Figure 27:
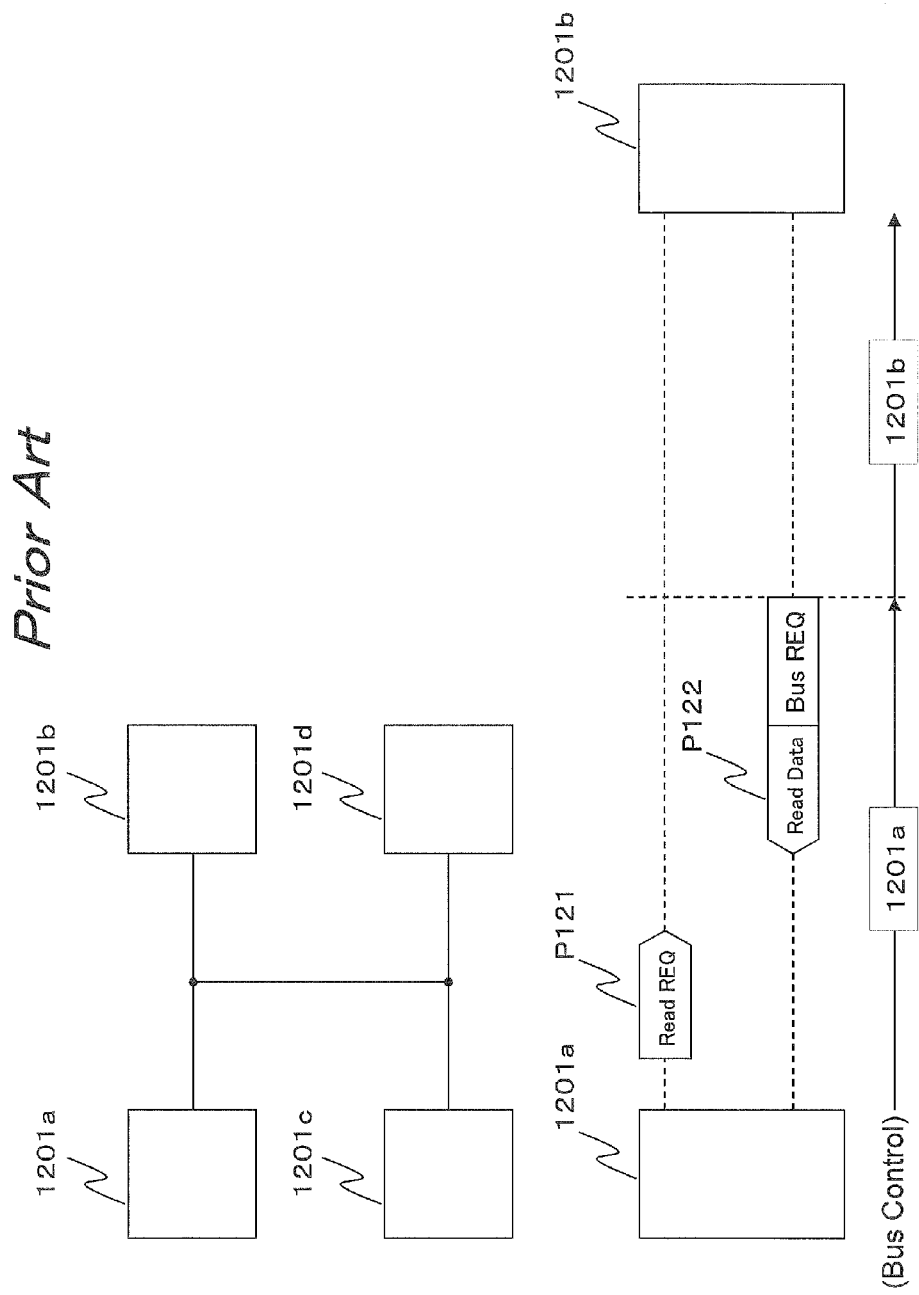
FIG. 27 illustrates prior art.

Also, as shown in FIG. 26, the dual-role device 3 may be connected with another master device 4 via a transmission path 5 that is not included in the ring connection. In this case, during transfer between devices, the dual-role device 3 may transfer data with the slave devices 2-1 and 2-2 under instruction from the master device 4. The transmission path 5 can be configured for either wired or wireless transmission.

Also, in the above embodiments, one-to-one and ring-shaped connections were used as examples, but these are not the only options. For example, the connection may be star-shaped, tree-shaped, or the like.

Also, a specific packet may be repeatedly sent instead of the abort signal used in the above embodiments.

Also, in the above embodiments, packets were used as the data unit, but this is not the only option. The present invention can be applied to any data unit that suits the protocol being used.

Also, in the communication system, master device, and slave device described in the above embodiments, each block may be individually made into a chip by using an IC or other such semiconductor device, and a single chip may include all or part of the block. Also, each device may be constituted by a dedicated circuit or a multipurpose processor, or part of it may be achieved by software.

As discussed above, embodiments were described as examples of the technology disclosed herein. The appended drawings and detailed description were provided to this end. Therefore, the constituent elements illustrated in the appended drawings and discussed in the Specification can encompass not only those constituent elements which are essential to solving the problem, but also constituent elements that are not essential to solving the problem. Accordingly, just because non-essential constituent elements are illustrated in the appended drawings and discussed in the Specification, it should not be concluded that these non-essential constituent elements are essential.

Also, the above embodiments were given to illustrate examples of the technology disclosed herein, so various modifications, substitutions, additions, omissions, and so forth can be made within the scope of the patent claims or equivalents thereof.

With the communication system disclosed herein, which is constituted by the slave device 2, the master device 1 and the dual-role device 3, even when the dual-role device acquires the bus control under instruction from the master device, and transfers data with a slave device, the master device will be able to take back the bus control at any time by instructing the dual-role device to stop this transfer. For example, in a communication system in which a system-on-a-chip includes a CPU as the master device 1, and in which a plurality of memory devices and wireless communication devices are connected as slave devices 2, the time it takes for the master device 1 to take back the bus control during transfer between devices can be shortened. As a result, a very responsive system can be obtained.

This disclosure relates to a communication system in which a slave device acquires a bus control under instruction from a master device, and transfer various kinds of information with other slave devices.

What is claimed is:

1. A slave device comprising:
a data input terminal configured to receive a command from a master device through a differential transmission line;
a data output terminal configured to transmit a response and an interrupt signal to the master device through the differential transmission line; and
an interrupt controller configured to control the interrupt signal,
wherein the interrupt controller is further configured to
output the interrupt signal repeatedly and transmit the interrupt signal to the master device, and
stop the repeated output of the interrupt signal when having received from the master device a command packet for clearing an interrupt, and
when the interrupt controller has received the interrupt signal from another slave device through the data input terminal, the interrupt controller transmits the received interrupt signal to the master device through the data output terminal.

2. The slave device according to claim 1,
wherein the interrupt signal is formed by a single symbol.

3. The slave device according to claim 1,
wherein the interrupt signal is formed by a plurality of symbols.

4. A slave device comprising:
a data input terminal configured to receive a command from a master device through a differential transmission line;
a data output terminal configured to transmit a response and an interrupt signal to the master device through the differential transmission line; and
an interrupt controller configured to control the interrupt signal,
wherein the interrupt controller is further configured to
output the interrupt signal repeatedly and transmit the interrupt signal to the master device, and
stop the repeated output of the interrupt signal when having received from the master device a command packet for clearing an interrupt, and
the interrupt signal includes a synchronizing symbol for synchronizing a clock and input data.

5. A master device comprising:
a data output terminal configured to transmit a command to a slave device through a differential transmission line;
a data input terminal configured to receive a response and an interrupt signal from the slave device through the differential transmission line; and
an interrupt controller configured to receive the interrupt signal through the data input terminal,
wherein the interrupt signal is formed by a symbol repeatedly output from the slave device, and
the interrupt controller is further configured to transmit a command packet to the slave device when having received the interrupt signal, and
the interrupt signal includes a synchronizing symbol for synchronizing a clock and input data.

6. A communication system, comprising:
a mater device including a first data output terminal configured to transmit a command to a slave device through a differential transmission line, a first data input terminal configured to receive a response and an interrupt signal from the slave device through the differential transmission line, and a first interrupt controller configured to receive the interrupt signal through the first data input terminal;
the slave device including a second data input terminal configured to receive the command from the master device through the differential transmission line, a second data output terminal configured to transmit the response and the interrupt signal to the master device through the differential transmission line, and a second interrupt controller configured to control the interrupt signal,
wherein the interrupt signal is formed by at least one symbol and repeatedly output from the slave device,
the first interrupt controller is further configured to transmit to the slave device a command packet for clearing an interrupt when having received the interrupt signal,
the second interrupt controller is further configured to stop the repeated output of the interrupt signal when having received from the master device the command packet, and
the interrupt signal includes a synchronizing symbol for synchronizing a clock and input data.

\* \* \* \* \*